United States Patent [19]

Deitz et al.

[11] Patent Number: 5,565,553

[45] Date of Patent: Oct. 15, 1996

[54] DISAZO DYES WITH A VINYLSULFONYL TYPE FIBER-REACTIVE RADICAL SUBSTITUTED DIAZO COMPONENT AND A 2-SULFOPHENYLENE MIDDLE COMPONENT CARRYING A FIBER-REACTIVE RADICAL IN THE 5-POSITION

[75] Inventors: Rolf Deitz; Paul Herzig, both of Basel; Athanassios Tzikas, Pratteln, all of Switzerland

[73] Assignee: Ciba-Geigy Corporation, Tarrytown, N.Y.

[21] Appl. No.: 584,582

[22] Filed: Jan. 11, 1996

Related U.S. Application Data

[63] Continuation of Ser. No. 317,434, Oct. 4, 1994, abandoned.

[30] Foreign Application Priority Data

Oct. 7, 1993 [CH] Switzerland ............................ 3022/93

[51] Int. Cl.⁶ ..................... C09B 62/09; C09B 62/513; D06P 1/38; D06P 3/58
[52] U.S. Cl. ............... 534/612; 534/618; 534/634; 534/635; 534/636; 534/637; 534/642; 534/643; 8/549
[58] Field of Search ............... 534/618, 634–637, 534/642, 643, 612; 8/549

[56] References Cited

U.S. PATENT DOCUMENTS

| | | | |
|---|---|---|---|
| 4,482,490 | 11/1984 | Imakori et al. ................... | 534/797 |
| 4,703,112 | 10/1987 | Mischke et al. .................. | 534/642 |
| 5,093,484 | 3/1992 | Herd ................................. | 534/642 |
| 5,359,041 | 10/1994 | Reddig et al. .................... | 534/635 |
| 5,405,415 | 4/1995 | Reiher et al. ..................... | 8/549 |

FOREIGN PATENT DOCUMENTS

| | | |
|---|---|---|
| 0554746 | 8/1993 | European Pat. Off. . |
| 2921309 | 12/1979 | Germany . |
| 3002365 | 7/1980 | Germany . |
| 3829595 | 3/1990 | Germany . |
| 3916661 | 11/1990 | Germany . |
| 2023158 | 12/1979 | United Kingdom . |

OTHER PUBLICATIONS

Chem. Abstract 120: 32,872 y (1994).
Chem. Abstract, 115: 10,843j (1991).
Chem. Abstract, 113: 80,519 r (1990).

*Primary Examiner*—Fiona T. Powers
*Attorney, Agent, or Firm*—Kevin T. Mansfield

[57] ABSTRACT

Reactive dyes of the formula

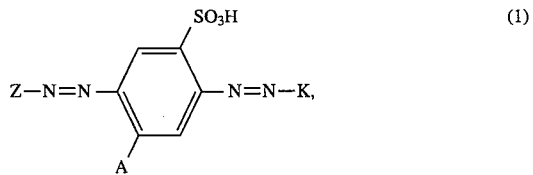

(1)

where A, K and Z are each as defined in the claims, are especially useful for dyeing or printing cellulosic fiber materials, producing dyeings and prints having good fastness properties in a high yield.

17 Claims, No Drawings

DISAZO DYES WITH A VINYLSULFONYL TYPE FIBER-REACTIVE RADICAL SUBSTITUTED DIAZO COMPONENT AND A 2-SULFOPHENYLENE MIDDLE COMPONENT CARRYING A FIBER-REACTIVE RADICAL IN THE 5-POSITION

This application is a continuation of application Ser. No. 08/317,434, filed Oct. 4, 1994, now abandoned.

The present invention relates to novel reactive dyes, processes for preparing them and their use for dyeing and printing fiber materials.

The industrial experience of dyeing with reactive dyes has in recent years led to increased expectations of the quality of the dyeings and the economics of the dyeing process. Consequently there continues to be a demand for novel reactive dyes with improved properties, especially in respect of application.

The dyeing of cellulosic materials such as cotton these days calls for reactive dyes which combine adequate substantivity with ease of removal of the unfixed portions by washing. They shall further be highly reactive and in particular yield dyeings having high degrees of fixation. Known dyes do not meet these requirements in all properties.

The present invention therefore has for its object to provide novel, improved reactive dyes for the dyeing and printing of cellulosic fiber materials which possess the above-characterized qualities to a high degree. The novel dyes shall be notable in particular for high yields of fixation and high fiber-dye bond stabilities. Also, the portions not fixed on the fiber shall be easy to wash off. They shall further produce dyeings having good allround fastness properties, for example light and wet fastness properties.

It has been found that this object is substantially achieved by the novel reactive dyes defined hereinafter.

The present invention accordingly provides reactive dyes of the formula

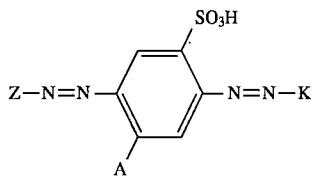

(1)

where

A is a fiber-reactive radical —NR'—$A_1$,

R' is hydrogen or $C_1$–$C_4$alkyl, $A_1$ is a halopyrimidinyl, haloquinoxalinecarbonyl or triazinyl radical or a radical of the formula —CO—$CH_2$—X     (2a)

—CO—$(CH_2)_n$—$SO_2$—Y     (2b),

—$COCHX_1$—$CH_2X_1$     (2c)

or

—$COCX_1$=$CH_2$     (2d), where Y is vinyl or —$CH_2$—$CH_2$—U and U is a leaving group, X and $X_1$ are each independently of the other chlorine or bromine, and n is an integer from 1 to 6, K is the radical of a coupling component, and Z is the radical of a diazo component of the benzene or naphthalene series which carries at least one fiber-reactive radical of the formula —$SO_2$—Y     (3a), —CONH—$(CH_2)_n$—$SO_2$—Y     (3b), —CONH—$(CH_2)_{m_1}$—O—$(CH_2)_m$—$SO_2$—Y     (3c), —$(O)_p$—$(CH_2)_q$—CONH—$(CH_2)_m$—$SO_2$—Y     (3d), —NH—CO—$CHX_1$—$CH_2X_1$     (3e)

or

—NH—CO—$CX_1$=$CH_2$     (3f)

where $X_1$ and Y are each as defined above, p is 0 or 1, and m, $m_1$ and q are each independently of the others an integer from 1 to 6.

$C_1$–$C_4$Alkyl is generally methyl, ethyl, n-propyl, isopropyl, n-butyl, isobutyl, sec-butyl or tert-butyl; $C_1$–$C_4$alkoxy is generally methoxy, ethoxy, n-propoxy, isopropoxy, n-butoxy, isobutoxy, sec-butoxy or ten-butoxy; halogen is generally for example fluorine, bromine or in particular chlorine; examples of substituted or unsubstituted $C_2$–$C_4$-alkanoylamino are acetylamino, propionylamino and hydroxyacetylamino. $C_1$–$C_4$-Alkoxycarbonyl is generally methoxycarbonyl, ethoxycarbonyl, n-propoxycarbonyl, isopropoxycarbonyl, n-butoxycarbonyl, isobutoxycarbonyl, sec-butoxycarbonyl or tert-butoxycarbonyl, preferably methoxycarbonyl or ethoxycarbonyl. Examples of $C_2$–$C_5$alkanoyloxy are acetyloxy and propionyloxy. Examples of $C_1$–$C_4$alkylthio are methylthio and ethylthio.

R' is preferably hydrogen, methyl or ethyl, particularly preferably hydrogen.

A halopyrimidinyl or haloquinoxalinecarbonyl radical $A_1$ can be for example 2,4-dichloropyrimidin-6-yl, 2,4,5-trichloropyrimidin-6-yl, 2,4-dichloro-5-nitro- or -5-methyl- or-5-carboxymethyl- or -5-carboxy- or-5-cyano- or-5-vinyl- or-5-sulfo- or -5-mono-, -di- or-trichloromethyl- or-5-carboalkoxy-pyrimidin-6-yl, 2,6-dichloropyrimidine-4-carbonyl, 2,4-dichloropyrimidine-5-carbonyl, 2-chloro-4-methylpyrimidine-5-carbonyl, 2-methyl-4-chloropyrimidine-5-carbonyl, 2-methylthio-4-fluoropyrimidine-5-carbonyl, 6-methyl-2,4-dichloropyrimidine-5-carbonyl, 2,4,6-trichloropyrimidine-5-carbonyl, 2,4-dichloropyrimidine-5-sulfonyl, 2-chloroquinoxaline-3-carbonyl, 2- or 3-monochloroquinoxaline-6-carbonyl, 2,3-dichloroquinoxaline-6-carbonyl, 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2,5-difluoro-6-methyl-4-pyrimidinyl, 2-fluoro-5-methyl-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 5-chloro-6-chloromethyl-2-fluoro-4-pyrimidinyl, 2,6-difluoro-5-bromo-4-pyrimidinyl, 2-fluoro-5-bromo-6-methyl-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl or-5-methylsulfonyl-4-pyrimidinyl, 2-fluoro-5-carbonamido-4-pyrimidinyl, 2-fluoro-5-carbomethoxy-4pyrimidinyl, 2-fluoro-5-bromo-6-trifluoromethyl-4-pyrimidinyl, 2-fluoro-6-carbonamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 2,6- difluoro-5-methylsulfonyl-4-pyrimidinyl, 2-fluoro-5-sulfonamido-4-pyrimidinyl, 2-fluoro-5-chloro-6-carbomethoxy-4-pyrimidinyl, 2,6-difluoro-5-trifluoromethyl-4-pyrimidinyl, 6-fluoro-5-chloropyrimidin-4-yl, 6-fluoro-5-trifluoromethylpyrimidin-4-yl, 6-fluoro-2-methylpyrimidin-4-yl, 6-fluoro-5-chloro-2-methylpyrimidin-4-yl, 5,6-difluoropyrimidin-4-yl, 6-fluoro-5-chloro-2-trifluoromethylpyrimidin-4-yl, 6-fluoro-2-phenylpyrimidin-4-yl, 6-fluoro-5-cyanopyrimidin-4-yl, 6-fluoro-5-nitropyrimidin-4-yl, 6-fluoro-5-methylsulfonylpyrimidin-4-yl or 6-fluoro-5-phenylsulfonylpyrimidin-4-yl.

A halopyrimidinyl or haloquinoxalinecarbonyl $A_1$ is preferably 2,4,5-trichloropyrimidin-6-yl, 2,4-dichloro-5-cyanopyrimidin-6-yl, 2,4-difluoro-5-chloropyrimidin-6-yl 2-fluoro-5-chloro-6-methylpyrimidin-4-yl or 2,3-dichloroquinoxaline-6-carbonyl.

A triazinyl $A_1$ conforms for example to the formula

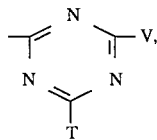  (4)

where T is chlorine, fluorine, bromine, 3-carboxypyridin-1-yl, 3-carbamoylpyridin-1-yl or a reactive radical of the formula

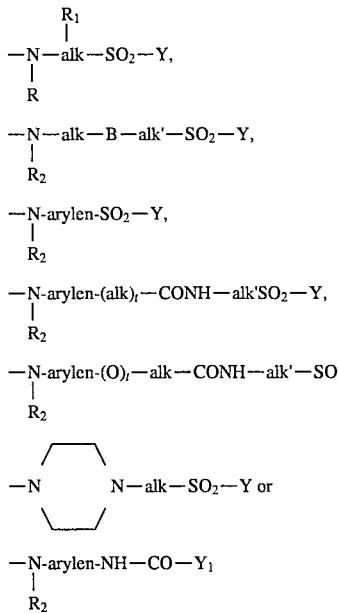

R is hydrogen, unsubstituted or hydroxyl-, sulfo-, sulfato-, carboxyl- or cyano-substituted $C_1$–$C_4$alkyl or a radical

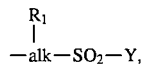

$R_1$ is hydrogen, hydroxyl, sulfo, sulfato, carboxyl, cyano, halogen, $C_1$–$C_4$alkoxycarbonyl, $C_2$–$C_5$alkanoyloxy, carbamoyl or the group —$SO_2$—Y, $R_2$ is hydrogen or $C_1$–$C_4$alkyl, alk and alk' are each independently of the other $C_1$–$C_6$alkylene, arylen is an unsubstituted or sulfo-, carboxyl-, hydroxyl-, $C_1$–$C_4$alkyl-, $C_1$–$C_4$alkoxy- or halogen-substituted phenylene or naphthylene radical, $Y_1$ is a group —$CHX_1$—$CH_2X_1$ or —$CX_1$=$CH_2$, and $X_1$ is chlorine or bromine, B is the radical —O— or —$NR_2$—, and t is 0 or 1, and V independently has the meaning of T or is a non-reactive radical selected from the group consisting of hydroxyl, $C_1$–$C_4$alkoxy, phenoxy, $C_1$–$C_4$alkylthio, morpholino and substituted or unsubstituted amino.

Suitable leaving groups U include for example —Cl, —Br, —F, —$OSO_3H$, —$SSO_3H$, —OCO—$CH_3$, —$OPO_3H_2$, —OCO—$CCl_3$, —OCO—$CHCl_2$, —OCO—$CH_2Cl$, —$OSO_2$—Cl —$C_1$–$C_4$alkyl, —$OSO_2$—N($C_1$–$C_4$alkyl)$_2$ or —OCO—$C_6H_5$.

Preferably U is a group of the formula —Cl, —$OSO_3H$, —$SSO_3H$, —OCO—$CH_3$, —OCO—$C_6H_5$ or —$OPO_3H_2$, in particular —Cl or —$OSO_3H$, preferably —$OSO_3H$.

Y is preferably vinyl, β-chloroethyl, β-sulfatoethyl, β-thiosulfatoethyl, β-acetoxyethyl, β-phenoxyethyl or β-phosphatoethyl, particularly preferably β-sulfatoethyl or vinyl.

$X_1$ is preferably bromine.

alk and alk' are each independently of the other for example a methylene, ethylene, 1,3-propylene, 1,4-butylene, 1,5-pentylene or 1,6-hexylene radical or branched isomers thereof.

Preferably alk and alk' are each independently of the other a $C_1$–$C_4$alkylene radical, particularly preferably an ethylene radical or propylene radical.

Preferably arylen is an unsubstituted or for example sulfo-, methyl-, methoxy- or carboxyl-substituted 1,3- or 1,4-phenylene radical, particularly preferably an unsubstituted 1,3- or 1,4-phenylene radical.

R is preferably $C_1$–$C_4$alkyl or particularly preferably hydrogen.

$R_1$ is preferably hydrogen.

$R_2$ is preferably hydrogen, methyl or ethyl, in particular hydrogen.

B is preferably —NH— or —O—, particularly preferably —O—.

t is preferably O.

Preference for use as radicals of the formulae (5a) to (5g) is given to those where R, $R_1$ and $R_2$ are each hydrogen, B is —O— or —NH—, alk and alk' are each independently of the other ethylene or propylene, arylen is unsubstituted or methyl-, methoxy-, chlorine-, hydroxyl-, carboxyl- or sulfo-substituted phenylene, Y is vinyl or β-sulfatoethyl, $Y_1$ is —CHBr—$CH_2Br$ or —CBr=$CH_2$ and t is 0.

A non-reactive substituted or unsubstituted amino radical V can be for example amino, N—$C_1$–$C_4$alkylamino or N,N-di-$C_1$–$C_4$alkylamino, in which case the alkyl may be for example, sulfo-, sulfato-, hydroxyl-, carboxyl- or phenyl-substituted, cyclohexylamino, N—$C_1$–$C_4$alkyl-N-phenylamino or phenylamino or naphthylamino, in which case the phenyl or naphthyl may be for example $C_1$–$C_4$alkyl-, $C_1$–$C_4$alkoxy-, amino-, $C_2$–$C_4$alkanoylamino-, carboxyl-, sulfo- or halogen-substituted.

Examples of suitable non-reactive radicals V are amino, methylamino, ethylamino, β-hydroxyethylamino, N,N-di-β-hydroxyethylamino, β-sulfoethylamino, cyclohexylamino, morpholino, o-, m- or p-chlorophenylamino, o-, m- or p-methylphenylamino, o-, m- or p-methoxyphenylamino, o-, m- or p-sulfophenylamino, 2,4- or 2,5-disulfophenylamino, o-carboxyphenylamino, 1- or 2-naphthylamino, 1-sulfo-2-naphthylamino, 1,5-disulfo-2-naphthylamino, 6,8-disulfo-2-naphthylamino, 3,6,8-trisulfo-2-naphthylamino, 1,6-disulfonaphthylamino, N-ethyl-N-phenylamino, N-methyl-N-phenylamino, morpholino, methoxy, ethoxy, n-propoxy or isopropoxy and hydroxyl.

A non-reactive radical V is preferably $C_1$–$C_4$alkoxy, $C_1$–$C_4$alkylthio, hydroxyl, in particular amino, N-$C_1$-$C_4$alkylamino, with or without hydroxyl, sulfato or sulfo substitution in the alkyl moiety, morpholino, phenylamino or N—$C_1$-$C_4$alkyl-N-phenylamino, where the phenyl is in each case unsubstituted or sulfo-, carboxyl-, acetylamino-, methyl-, or methoxy-substituted, or sulfo-monosubstituted, -disubstituted or -trisubstituted 2-naphthylamino.

Particularly preferred non-reactive radicals V are amino, N-methylamino, N-ethylamino, β-sulfoethylamino, phenylamino, 2-, 3- or 4-sulfophenylamino, 2,4- or 2,5-disulfophenylamino, mono-, di-or trisulfo-2-naphthylamino, N-$C_1$-$C_2$alkyl-N-phenylamino or morpholino.

A further group of suitable amino radicals V conforms to the formula

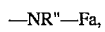
—NR"—Fa, where Fa is a monoazo radical —(D—N=N—$K_1$) or the radical of a formazan, R" is independently subject to the meanings and preferences mentioned for R', D is the radical of a diazo component of the benzene or naphthalene series or of the heterocyclic series, and $K_1$ is the radical of a coupling component. Preferably, D is a phenyl or 1- or 2-naphthyl radical which is substituted by from 1 to 3 substituents selected from the group consisting of methyl, methoxy, chlorine, sulfo and —$SO_2$—Y, where Y is as defined above, and K is the radical of 1-amino-8-hydroxynaphthalene-3,6-disulfonic acid (H-acid), the radical of K-, I- or J-acid, or a radical of the formula (6a), (6b), (6d) or (6e) given below.

Suitable formazan radicals Fa conform for example to the formula

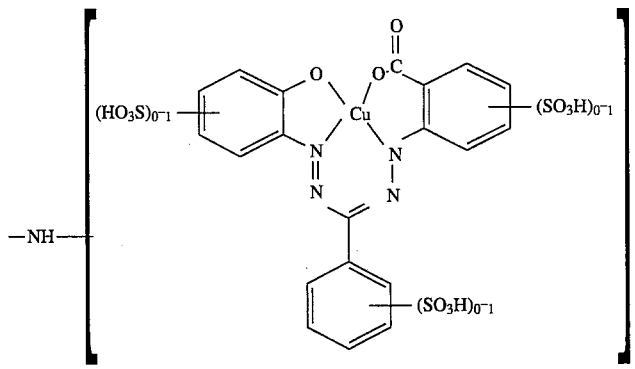

A fiber-reactive triazinyl radical $A_1$ is preferably a radical of the above-indicated formula (4) where T is chlorine or fluorine and V is $C_1$-$C_4$alkoxy, $C_1$-$C_4$alkylthio, hydroxyl, amino, N-$C_1$-$C_4$alkylamino, with or without hydroxyl, sulfato or sulfo substitution in the alkyl moiety, morpholino, phenylamino or N-$C_1$-$C_4$alkyl-N-phenylamino, where the phenyl is in each case unsubstituted or sulfo-, carboxyl-, acetylamino-, methyl- or methoxy-substituted, sulfo-monosubstituted, -disubstituted or -trisubstituted 2-naphthylamino or a reactive radical of the above-indicated formula (5a) to (5g).

A fiber-reactive triazinyl radical $A_1$ is particularly preferably a radical of the above-indicated formula (4) where T is chlorine or fluorine and V is amino, N-methylamino, N-ethylamino, β-sulfoethylamino, phenylamino, 2-, 3- or 4-sulfophenylamino, 2,4- or 2,5-disulfophenylamino, mono-, di- or trisulfo-2-naphthylamino, N—$C_1$-$C_2$alkyl-N-phenylamino or morpholino.

A fiber-reactive triazinyl radical $A_1$ can preferably also be a radical of the above-indicated formula (4) where T is chlorine or fluorine and V is a fiber-reactive radical of the formula

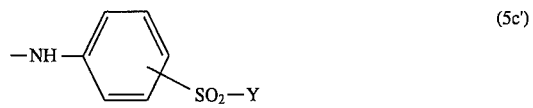

or

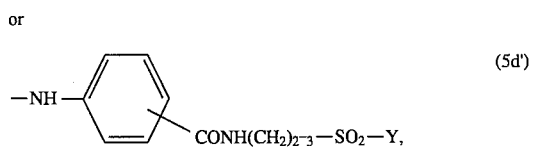

where Y is vinyl or β-sulfatoethyl.

A fiber-reactive radical $A_1$ of the formula (2a) to (2d) is preferably a radical of this kind where X is chlorine, $X_1$ is bromine, Y is vinyl or β-sulfatoethyl, and n is 2, 3 or 4. Of particular interest in this connection are compounds of the formula (1) where A is the radical —NH—$A_1$ and $A_1$ is chloroacetyl.

K is in particular the radical of a water-soluble coupling component of the series of the aminobenzenes or phenols, in particular of the sulfonated or carboxylated aminobenzenes or phenols; of the naphthylamines or naphthols, in particular of the sulfonated or carboxylated naphthylamines or naphthols; of the aminonaphthols, in particular of the sulfonated aminonaphthols; of the acylaminonaphthols, in particular of the sulfonated acylaminonaphthols having the acyl radical of an alkanoic or alkenoic acid in each case having 1 to 4, preferably 2 to 4, carbon atoms in the alkyl or alkenyl moiety; or of the series of the pyrazolones, pyridones or pyrimidines, and K, in addition to the substituents customary in dyes, may contain a further azo group and/or one or more fiber-reactive groups.

Of the series of substituents on the radical K, there may be mentioned for example lower alkyl groups having 1 to 4 carbon atoms such as methyl, ethyl, propyl, isopropyl or butyl, alkoxy groups having 1 to 4 carbon atoms, such as methoxy, ethoxy, propoxy, isopropoxy or butoxy, hydroxy-$C_1$-$C_2$alkoxy, e.g. hydroxyethoxy, acylamino groups having 1 to 8 carbon atoms, in particular alkanoylamino groups, such as acetylamino, or propionylamino, or benzoylamino; phenylamino, N,N-di-β-hydroxyethylamino, N,N-di-β-sulfatoethylamino, sulfobenzylamino, N,N-disulfobenzoylamino; alkoxycarbonyl having 1 to 4 carbon atoms in the alkoxy radical, such as methoxycarbonyl or ethoxycarbonyl; alkylsulfonyl having 1 to 4 carbon atoms, such as methylsulfonyl or ethylsulfonyl; trifluoromethyl, nitro, cyano, halogen, such as fluorine, chlorine or bromine; carbamoyl, N-alkylcarbamoyl having 1 to 4 carbon atoms in the alkyl radical, such as N-methylcarbamoyl or N-ethylcarbamoyl; sulfamoyl, N-alkylsulfamoyl having 1 to 4 carbon atoms, such as N-methylsulfamoyl, N-ethylsulfamoyl, N-propylsulfamoyl, N-isopropylsulfamoyl or N-butylsulfamoyl; N-(β-hydroxyethyl)sulfamoyl, N,N-di-(β-hydroxyethyl)sulfamoyl, N-phenylsulfamoyl, ureido, hydroxyl, carboxyl, sulfomethyl, sulfo, benzoyl, $C_2$–$C_5$alkanoyl, e.g. acetyl or propionyl, phenylazo, which is further substituted by one or more radicals, for example from the group consisting of sulfo, methyl, methoxy, chlorine and reactive radical of the above-indicated formula (3a), (3b) or (4), or naphthylazo which is further substituted by one or more radicals selected from the group consisting of hydroxyl, amino, sulfo, and reactive radical of the above-indicated formula (3a) or (4).

One or more fiber-reactive groups on K will be customary aliphatic or heterocyclic radicals having detachable groups or atoms, for example a radical of the above-indicated formula (3a) or (3b), an above-indicated halopyrimidinyl or haloquinoxalinecarbonyl radical, or preferably a fiber-reactive triazinyl radical of the above-indicated formula (4). K is preferably a 1- or 2-naphthol radical with or without substitution by sulfo or by a radical —$SO_2$—Y, where Y is as defined above, or is a 1- or 2-naphthylamine radical with or without substitution by hydroxyl, sulfo or a radical —$SO_2$—Y, where Y is as defined above, or is a radical of the formula

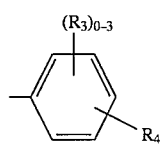
(6a)

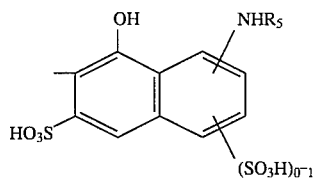
(6b)

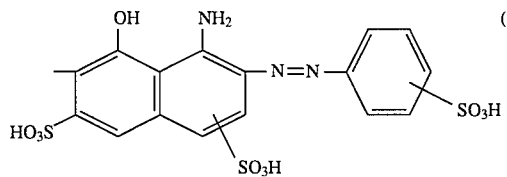
(6c)

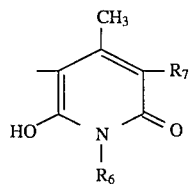
(6d)

or

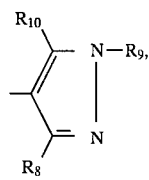
(6e)

where $(R_3)_{0-3}$ represents 0 to 3 radicals selected from the group consisting of $C_1$–$C_4$alkyl, $C_1$–$C_4$alkoxy, halogen, $C_1$–$C_4$alkoxy-$C_1$–$C_2$alkoxy, hydroxyl, hydroxy-$C_1$–$C_2$alkoxy, $C_2$–$C_5$alkanoyloxy, $C_1$–$C_4$alkylsulfonyl, $C_2$–$C_4$alkanoylamino, N—$C_1$–$C_4$alkylsulfamoyl and sulfo, $R_4$ is hydroxyl, $C_1$–$C_4$alkoxy or a radical —$NR_{11}R_{12}$ and $R_{11}$ and $R_{12}$ are each independently of the other hydrogen, $C_2$–$C_5$alkanoyl or unsubstituted or hydroxyl-, sulfo- or sulfato-substituted $C_1$–$C_4$alkyl, $R_5$ is hydrogen, $C_2$–$C_5$alkanoyl, benzoyl or a radical of the above-indicated formula (4), $R_6$ is $C_1$–$C_4$alkyl, $R_7$ is carbamoyl, cyano or sulfomethyl, $R_8$ is $C_1$–$C_4$alkyl or carboxyl, $R_9$ is unsubstituted or halogen-, sulfo-, $C_1$–$C_4$alkyl- or $C_1$–$C_4$alkoxy-substituted phenyl or naphthyl, and $R_{10}$ is hydroxyl or amino.

K particularly preferably has the following meanings:

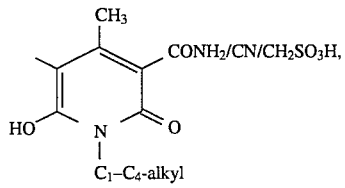

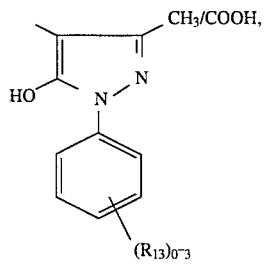

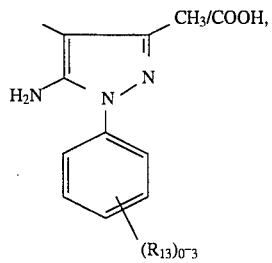

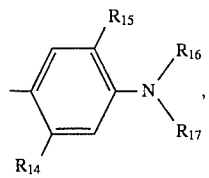

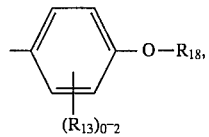

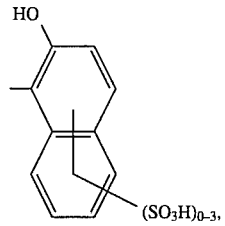

9
-continued

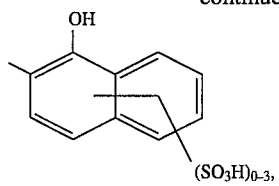
(SO₃H)₀₋₃,

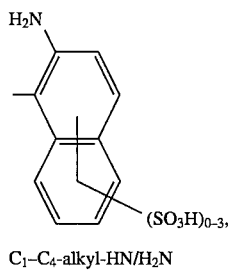
(SO₃H)₀₋₃,

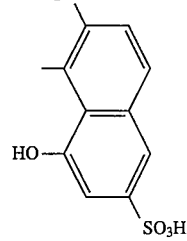

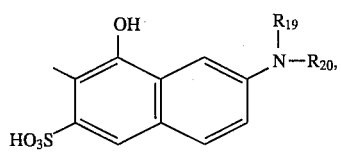

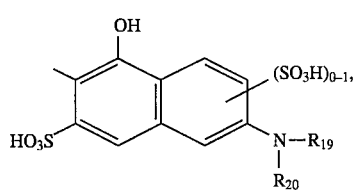

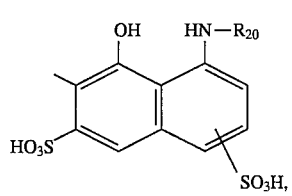

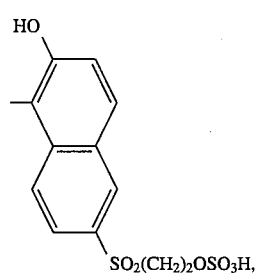

10
-continued

SO₂(CH₂)₂OSO₃H, where $(R_{13})_{0-3}$ represents 0 to 3 identical or different substituents selected from the group consisting of methyl, methoxy, hydroxyl, chlorine and sulfo, $R_{14}$ is hydrogen, methyl, methoxy, hydroxyl, chlorine, acetyl, acetylamino, hydroxyacetylamino, propionylamino, ureido or methyl- or ethylsulfonyl, $R_{15}$ is hydrogen, methyl, methoxy, chlorine or $C_1$–$C_4$alkoxy-$C_1$–$C_2$alkoxy, $R_{16}$ and $R_{17}$ are each independently of the other hydrogen, $C_1$–$C_4$alkyl, β-hydroxyethyl or β-sulfatoethyl, $R_{18}$ is hydrogen, $C_1$–$C_4$alkyl, $C_1$–$C_4$alkoxy-$C_1$–$C_4$alkyl or phenyl, $R_{19}$ is hydrogen, methyl, ethyl, β-hydroxyethyl, β-cyanoethyl or β-sulfatoethyl, and $R_{20}$ is acetyl, propionyl or a radical of the above-indicated formula (4).

K can also preferably be a radical of the formula

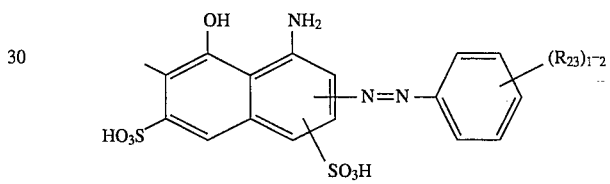

or

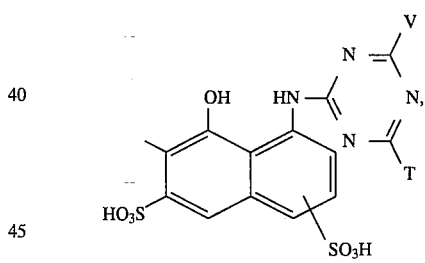

where $(R_{23})_{1-2}$ represents 1 or 2 identical or different radicals selected from the group consisting of sulfo, methyl, methoxy and —SO₂—Y, where Y is as defined above, T is chlorine or fluorine, and V is amino, N—$C_1$–$C_4$alkylamino or N,N-di-$C_1$–$C_4$alkylamino, the alkyl being unsubstituted or sulfo-, sulfato-, hydroxyl-, carboxyl- or phenyl-substituted, cyclohexylamino, N-$C_1$–$C_4$alkyl-N-phenylamino or phenylamino or naphthylamino, the phenyl or naphthyl being unsubstituted or $C_1$–$C_4$alkyl-, $C_1$–$C_4$alkoxy-, amino-, $C_2$–$C_4$alkanoylamino-, carboxyl-, sulfo- or halogen-substituted, a radical of the formula

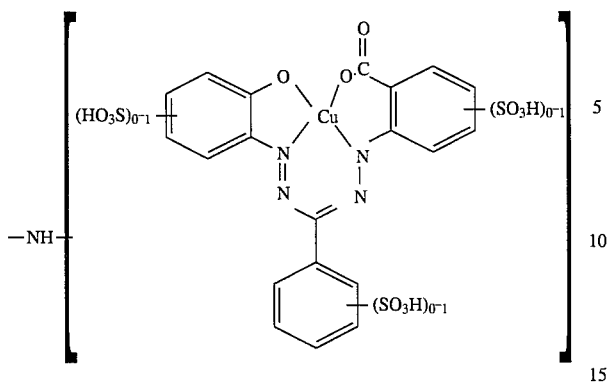

or a monoazo radical —(D—N=N—K$_1$), where D is a phenyl or 1- or 2-naphthyl radical which is substituted by from 1 to 3 substituents selected from the group consisting of methyl, methoxy, chlorine, sulfo and —SO$_2$—Y, where Y is as defined above, and K is the radical of 1-amino-8-hydroxynaphthalene-3,6-disulfonic acid (H-acid), the radical of K-, I- or J-acid, or a radical of the above-indicated formula (6a), (6b), (6d) or (6e).

Z is a phenyl or naphthyl radical which, in addition to fiber-reactive radicals, can contain the substituents customary in organic dyes. Examples of such substituents include C$_1$–C$_4$alkyl, C$_1$–C$_4$alkoxy, acylamino groups having 1 to 8 carbon atoms, in particular alkanoylamino groups and alkoxycarbonylamino groups, such as acetylamino, propionylamino, methoxycarbonylamino, ethoxycarbonylamino or benzoylamino, phenylamino, N,N-di-β-hydroxyethylamino, N,N-di-β-sulfatoethylamino, sulfobenzylamino, N,N-disulfobenzylamino; alkoxycarbonyl having 1 to 4 carbon atoms in the alkoxy radical, such as methoxycarbonyl or ethoxycarbonyl; alkylsulfonyl having 1 to 4 carbon atoms, such as methylsulfonyl or ethylsulfonyl; trifluoromethyl, nitro, cyano, halogen, such as fluorine, chlorine or bromine; carbamoyl, N-alkylcarbamoyl having 1 to 4 carbon atoms in the alkyl radical, such as N-methylcarbamoyl or N-ethylcarbamoyl; sulfamoyl, N-alkylsulfamoyl having 1 to 4 carbon atoms, such as N-methylsulfamoyl, N-ethylsulfamoyl, N-propylsulfamoyl, N-isopropylsulfamoyl or N-butylsulfamoyl; N-(β-hydroxyethyl)sulfamoyl, N,N-di-(β-hydroxyethyl)sulfamoyl, N-phenylsulfamoyl, ureido, hydroxyl, carboxyl, sulfomethyl or sulfo.

The reactive radicals of the above-indicated formula (3a) to (3θ in Z are subject to the abovementioned definitions and preferences as regards X$_1$ and Y.m$_1$ and m are each preferably independently of the other 2, 3 or 4, particularly preferably 2 or 3, very particularly preferably 2. p is preferably 0, and q is preferably 1, 2 or 3, particularly preferably 1 or 2.

The Z is preferably a phenyl radical which carries a fiber-reactive radical of the formula (3a) or (3b) and is further unsubstituted or sulfo-, methyl-, chlorine- hydroxyl- or methoxy-substituted, or is a 1- or 2-naphthyl radical which carries a fiber-reactive radical of the formula (3a) and is further unsubstituted or sulfo-substituted.

A preferred embodiment of the present invention concerns compounds of the formula (1) where Z is a fiber-reactive radical of the formula

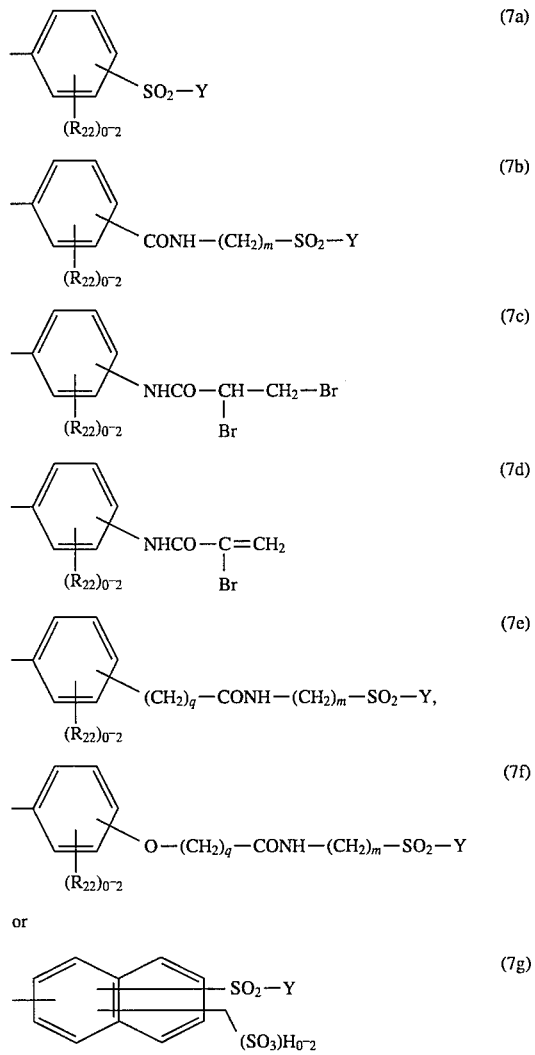

where Y is subject to the abovementioned meanings and preferences, (R$_{22}$)$_{0-2}$ represents 0 to 2 identical or different radicals selected from the group consisting of methyl, methoxy, chlorine, hydroxyl and sulfo, q is 1 or 2, and m is 2 or 3.

Particularly preferably Z is a radical of the formula

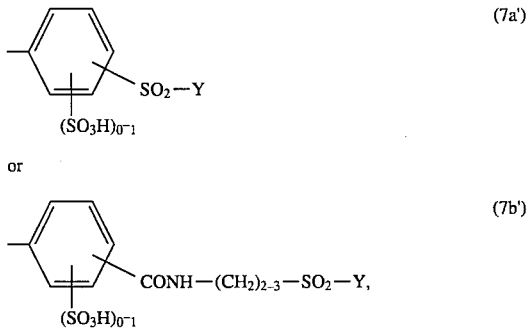

where Y is vinyl or β-sulfatoethyl.

The compounds of the formula (1) have at least two, preferably two to eight, particularly preferably three to six, sulfo or sulfato groups; these can each be present in the form of the free acid or preferably in salt form, for example as sodium, lithium, potassium or ammonium salt. The compounds of the formula (1) can also be present as mixed salt, for example as sodium-lithium or sodium-lithium-ammonium salt.

The compounds of the formula (1) are fiber-reactive. Fiber-reactive radicals are to be understood as meaning radicals capable of reacting with the hydroxyl groups of cellulose, the amino, carboxyl, hydroxyl and thiol groups in the case of wool and silk, or with the amino and possibly carboxyl groups of synthetic polyamides to form covalent chemical bonds.

The process for preparing the reactive dyes of the formula (1) comprises diazotizing a compound of the formula

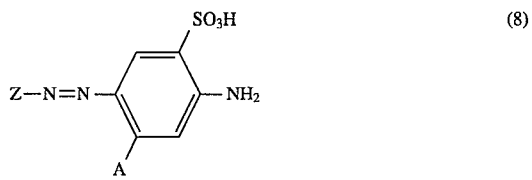
(8)

where A and Z are each as defined in the formula (1), and coupling the diazotization product with a coupling component K—H with or without a further conversion reaction, for example again diazotizing the intermediate product of the coupling reaction and coupling it with a further coupling component of the defined group K with or without further reaction, or coupling the intermediate product with a further diazo component.

A further method comprises first preparing a dye which contains a precursor of the reactive radical and subsequently convening this precursor stage into the final stage, for example by esterification or an addition reaction.

It is also possible for the synthesis to be followed by elimination reactions. For instance, a reactive dye of the formula (1) which contains sulfatoethylsulfonyl radicals can be treated with hydrogen halide eliminators, such as sodium hydroxide, to convert the sulfatoethylsulfonyl radicals into vinylsulfonyl radicals.

The compounds of the formula (8) are likewise fiber-reactive and novel. A further part of the subject-matter of the present invention therefore comprises compounds of the formula

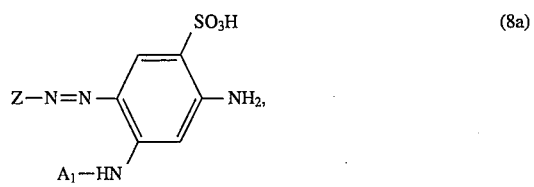
(8a)

where $A_1$ and Z are each subject to the abovementioned meanings and preferences.

The compounds of the formula (8) or (8a) can be obtained for example by diazotizing a compound of the formula

Z—NH$_2$ (9)

in a conventional manner and coupling it with a compound of the formula

(10)

where A and Z are each as defined above. The compounds of the formulae (9) and (10) are known or can be prepared in a manner known per se.

The reactive dyes of formula (1) and the compounds of formula (8) are suitable for dyeing and printing a very wide range of materials, such as silk, leather, wool, polyamide fibers and polyurethanes, and in particular cellulosic fiber materials of any kind. These fiber materials include for example the natural cellulose fibers, such as cotton, linen and hemp, and also pulp and regenerated cellulose. The reactive dyes of the formula (1) are also suitable for dyeing or printing hydroxyl-containing fibers present in blend fabrics, for example blends of cotton with polyester fibers or polyamide fibers.

The dyes of the invention can be applied to and fixed on the fiber materials in various ways, in particular in the form of aqueous dye solutions and print pastes. They are suitable not only for the exhaust method but also for dyeing by the padding method, can be used at low dyeing temperatures, and require only short steaming times in pad-steam processes. The degrees of fixation are high, and the unfixed portions are easy to wash off, the difference between the degree of exhaustion and the degree of fixation being remarkably small, i.e. the loss on soaping being very small. The reactive dyes of the formula (1) are also suitable for printing, especially on cotton, but also for printing nitrogen-containing fibers, for example wool, silk or wool-containing blend fabrics.

The dyeings and prints on cellulose fiber materials prepared with the dyes of the invention have a high colour strength and a high fiber-dye bond stability not only in the acid but also in the alkaline range, also good light fastness and very good wet fastness properties, such as wash, water, seawater, cross-dyeing and perspiration fastness properties, and also good fastness to pleating, fastness to hot pressing, crock fastness and in particular chlorine fastness.

The Examples which follow illustrate the invention. The temperatures are given in degrees Celsius and parts and percentages are by weight, unless otherwise stated. Parts by weight relate to parts by volume as the kilogram to the liter.

The most important process variants are described in the illustrative embodiments.

Preparation of the intermediates of the formula (8)

Example 1

44.8 parts of 2-naphthylamino-1-sulfonic acid are dissolved in 400 parts of water under neutral conditions, and the solution is cooled down to 0°–5° C. At this temperature, 28.3 parts of 2,4,6-trifluoro-1,3,5-triazine are added dropwise over 20 minutes while the pH of the reaction solution is kept at 7 by the simultaneous addition of sodium hydroxide solution. Following addition of a neutral mixture of 37.9 parts of 1,3-phenylenediamine-4-sulfonic acid in 300 parts of water, the reaction mixture is left at 0°–2° C. and pH 7–8 for 1 hour for the condensation reaction to proceed. The temperature is then raised to 20°–25° C. over about 2 hours. After the reaction has ended, 56.2 parts of diazotized 1-amino-4-(2-sulfatoethylsulfonyl)benzene are added, and the coupling reaction is carried out at 0°–10° C. and pH 4–5. Stirring at 5°–20° C. and pH 7 for 1 hour gives the dye of the formula:

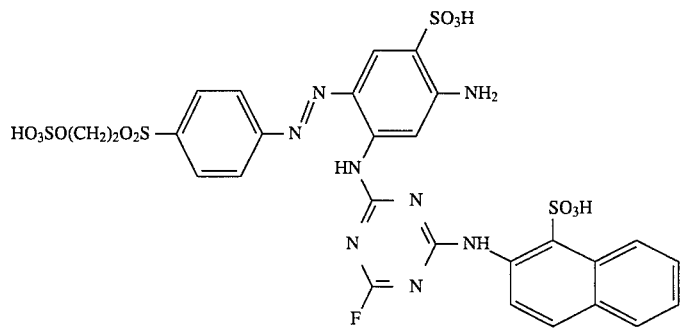
It dyes cotton in yellow shades.
Examples 2–30q
The method of Example 1 can be used to prepare the following compounds which each dye cotton in a yellow shade:
| Ex.: | Compound of the formula |
|---|---|
| 2 | 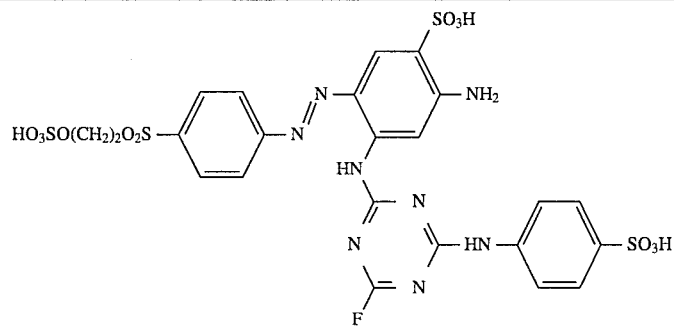 |
| 3 | 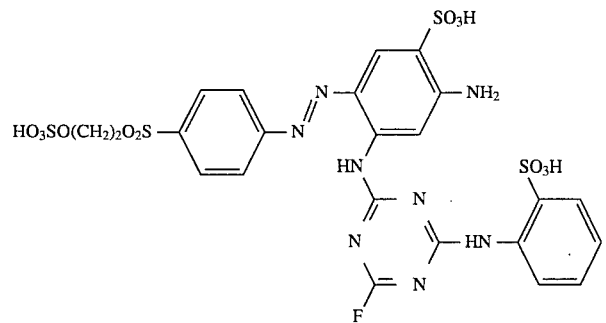 |
| 4 | 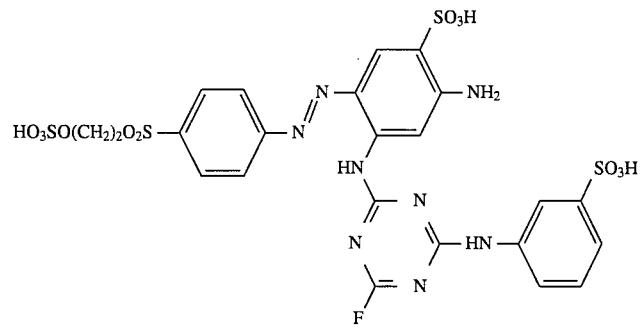 |

-continued
| Ex.: | Compound of the formula |
|---|---|
| 5 | 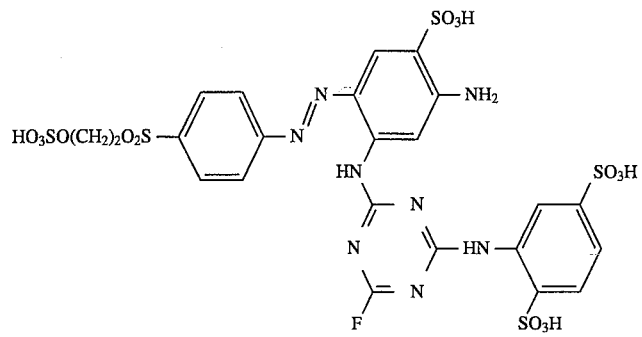 |
| 6 | 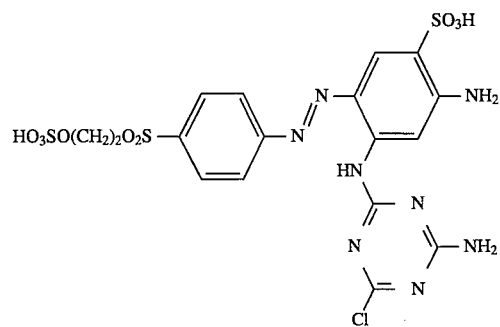 |
| 7 | 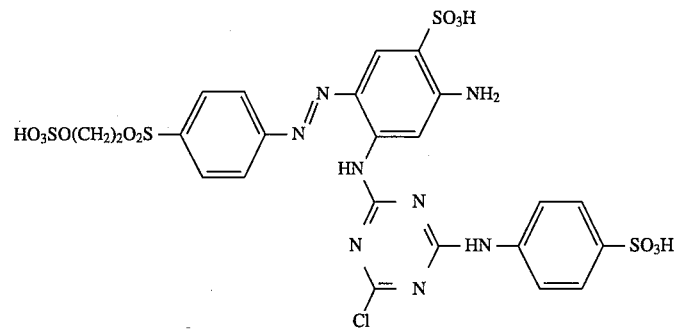 |
| 8 | 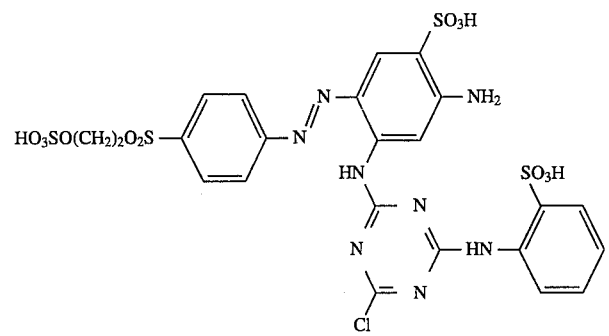 |
| 9 | 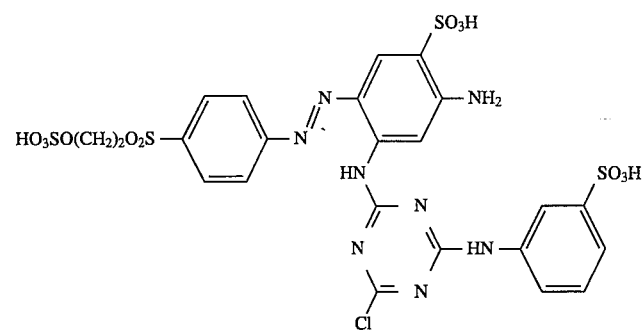 |

-continued
| Ex.: | Compound of the formula |
|---|---|
| 10 | 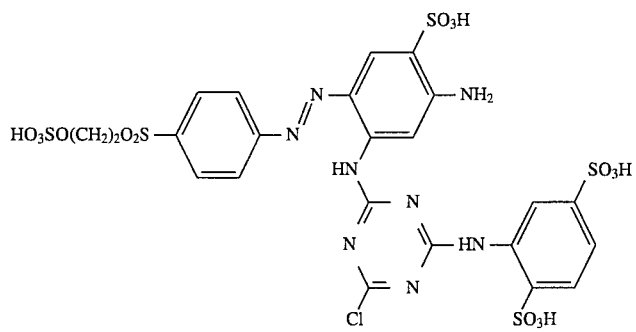 |
| 11 | 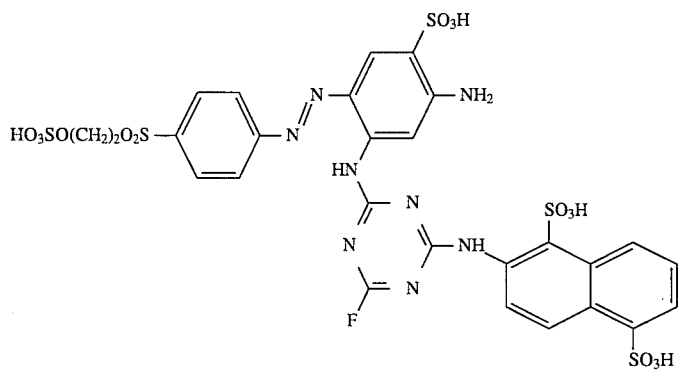 |
| 12 | 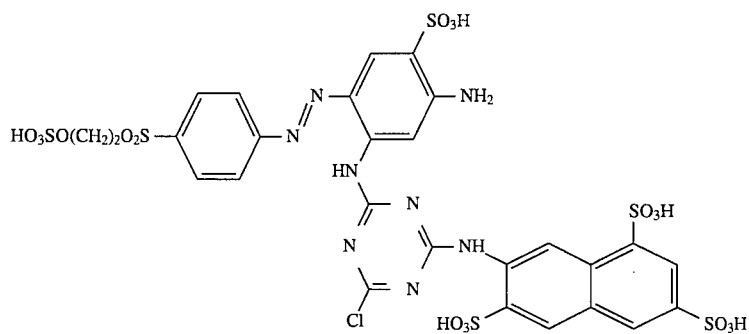 |
| 13 | 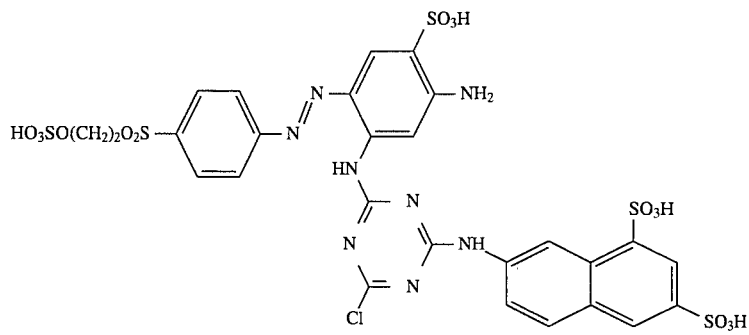 |

| Ex.: | Compound of the formula |
|---|---|
| 14 | 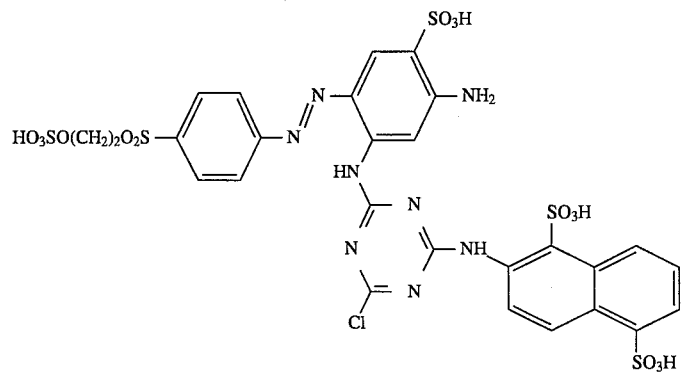 |
| 15 | 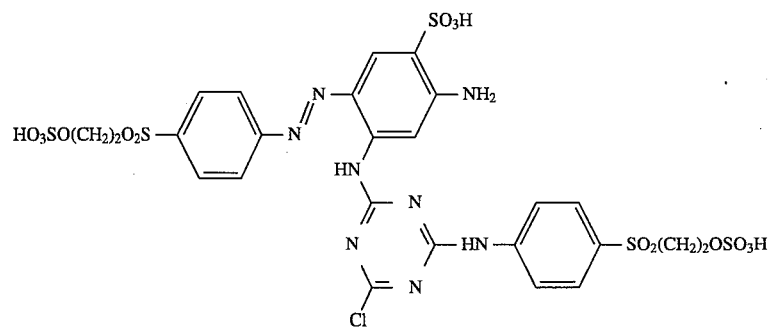 |
| 16 | 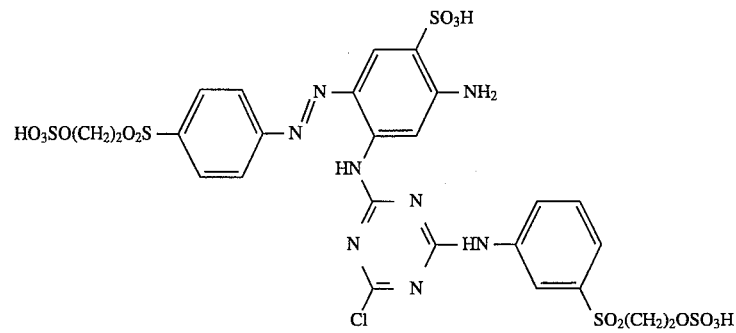 |
| 17 | 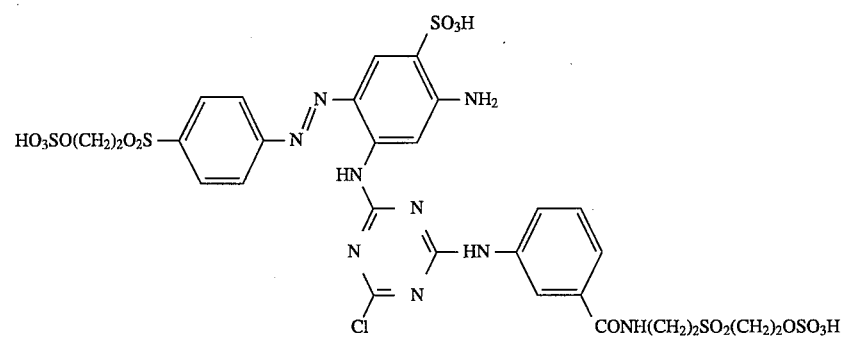 |

| Ex.: | Compound of the formula |
|---|---|
| 18 | 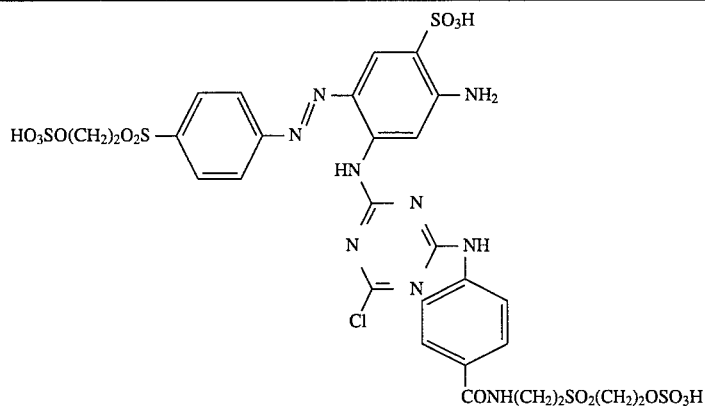 |
| 19 | 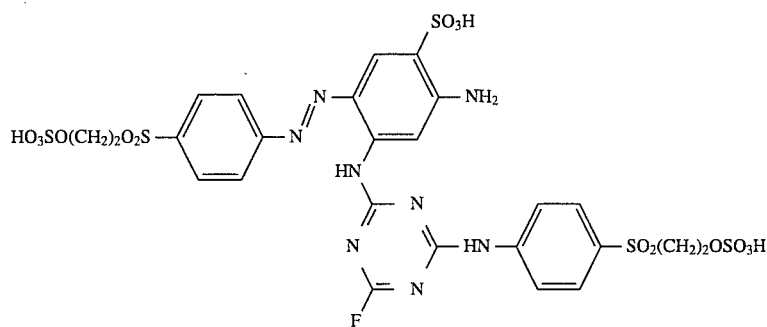 |
| 20 | 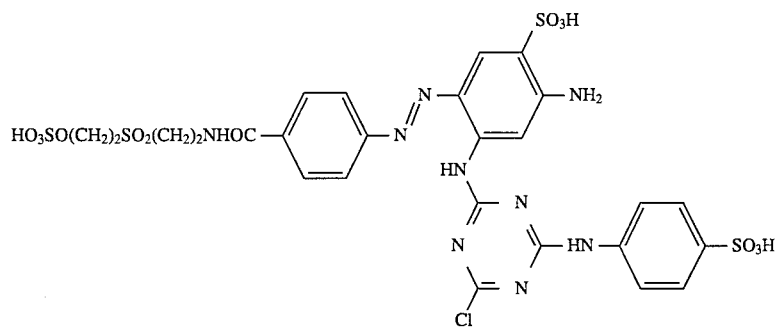 |
| 21 | 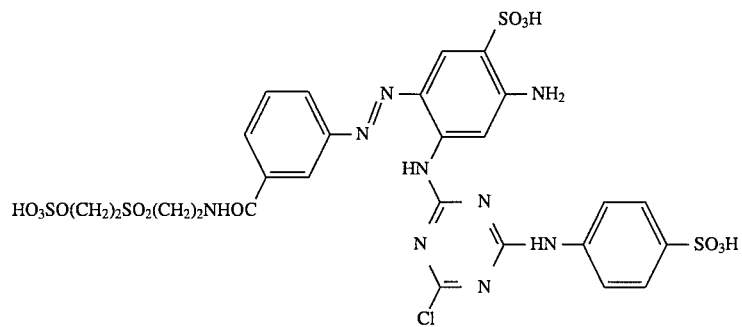 |

-continued
| Ex.: | Compound of the formula |
|---|---|
| 22 | 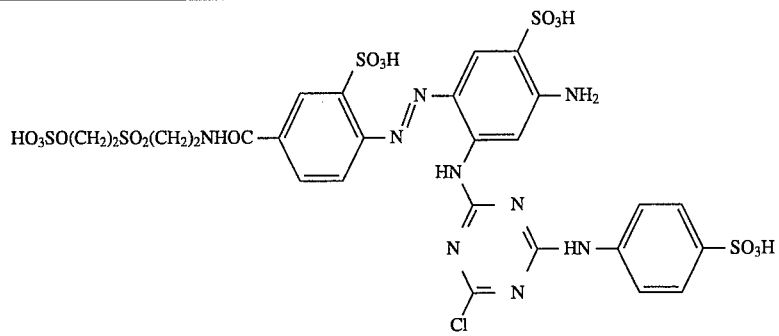 |
| 23 | 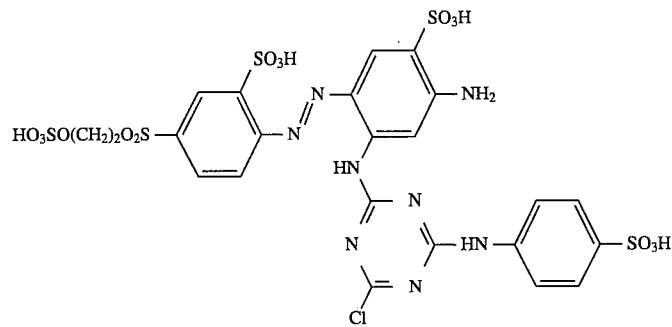 |
| 24 | 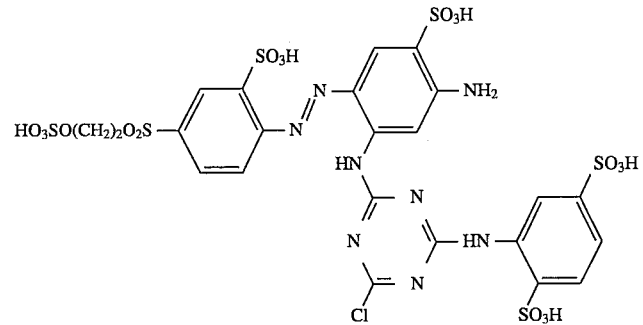 |
| 25 | 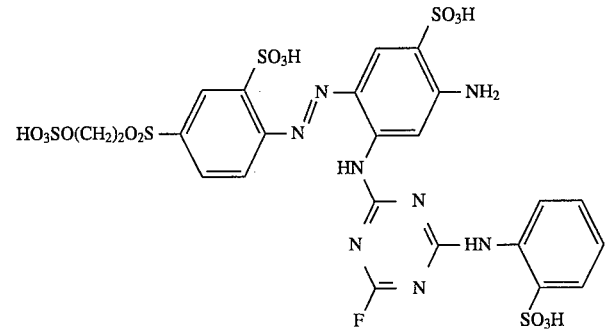 |
| 26 | 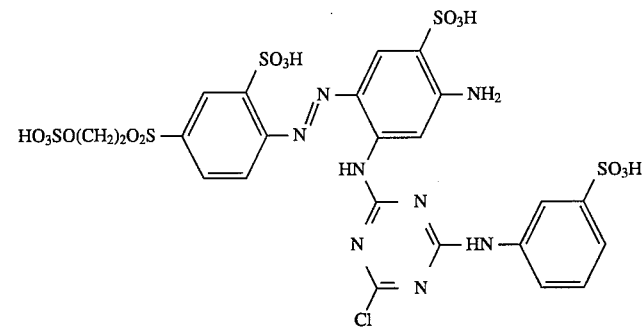 |

| Ex.: | Compound of the formula |
|---|---|
| 27 | 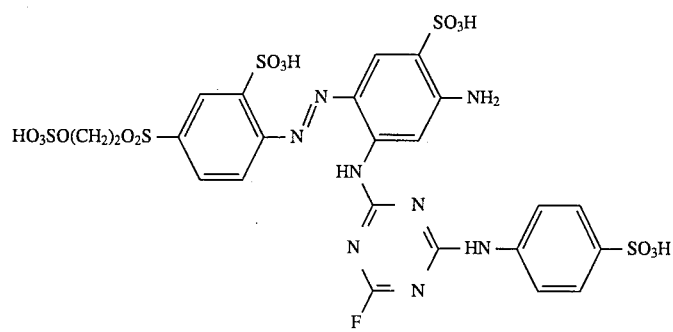 |
| 28 | 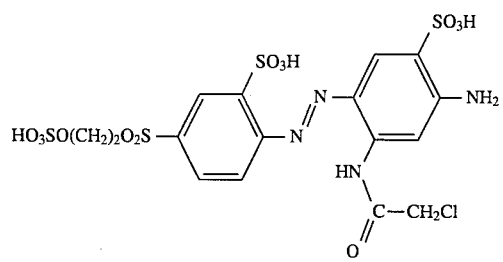 |
| 29 | 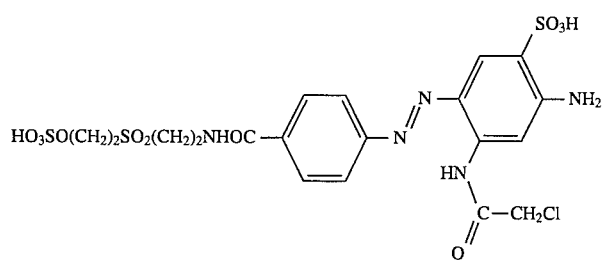 |
| 30 | 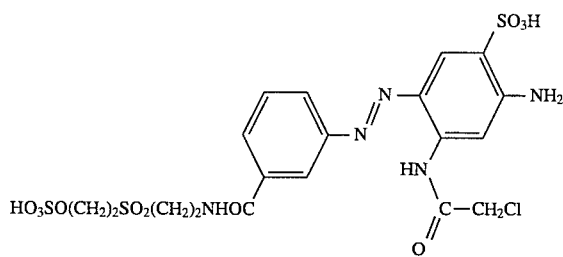 |
| 30a | 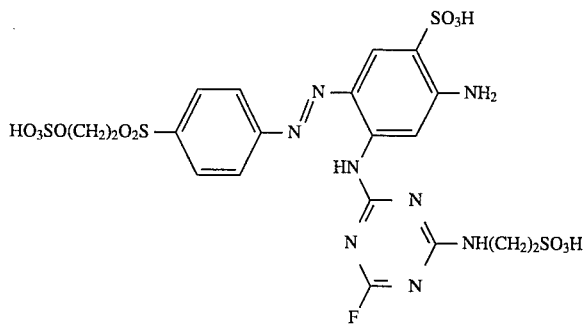 |

-continued
| Ex.: | Compound of the formula |
|---|---|
| 30b | 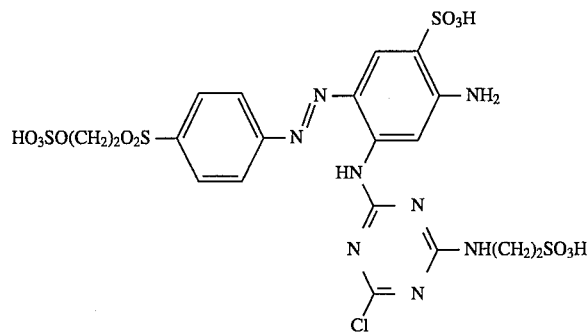 |
| 30c | 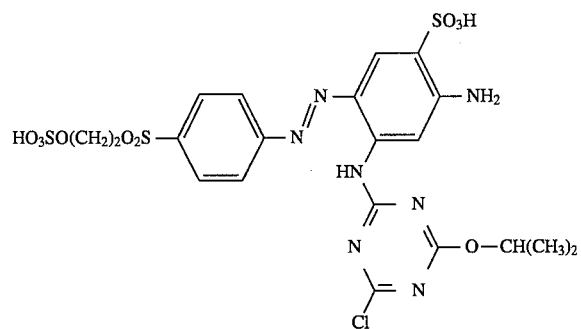 |
| 30d | 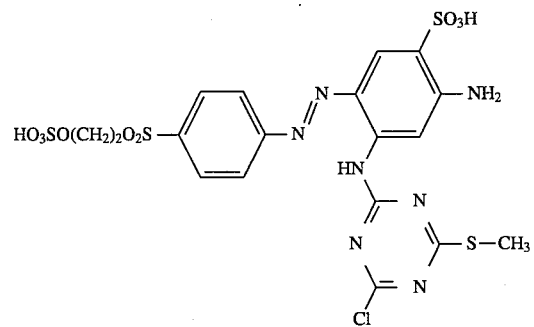 |
| 30e | 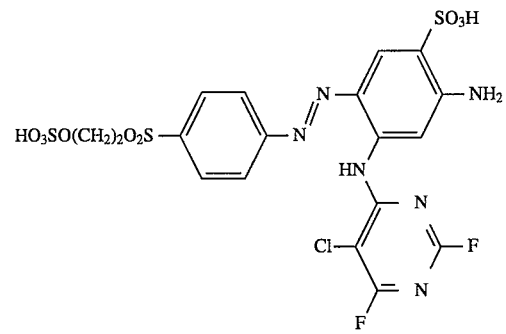 |
| 30f | 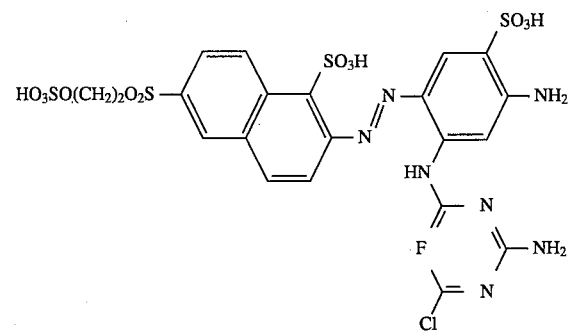 |

| Ex.: | Compound of the formula |
|---|---|
| 30g | 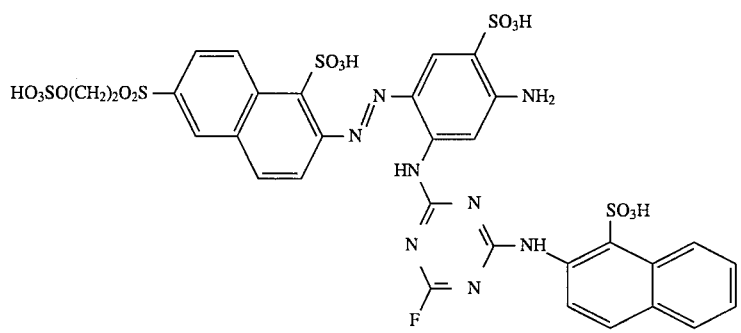 |
| 30h | 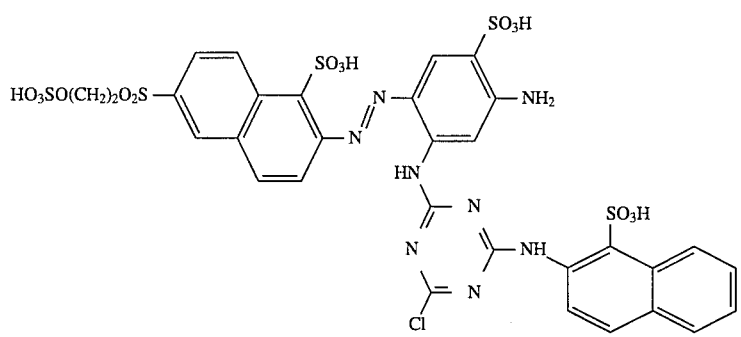 |
| 30i | 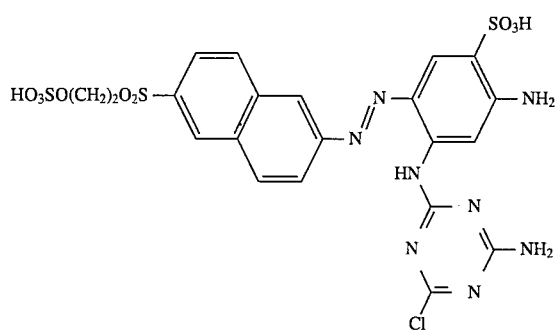 |
| 30j | 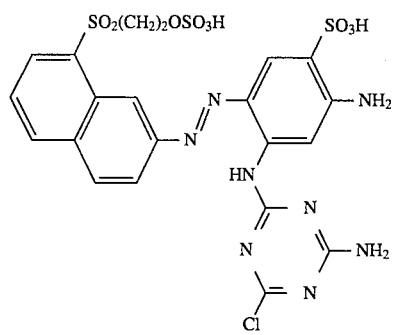 |

| Ex.: | Compound of the formula |
|---|---|
| 30k | 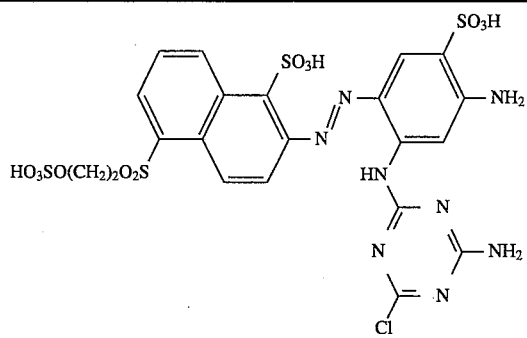 |
| 30l | 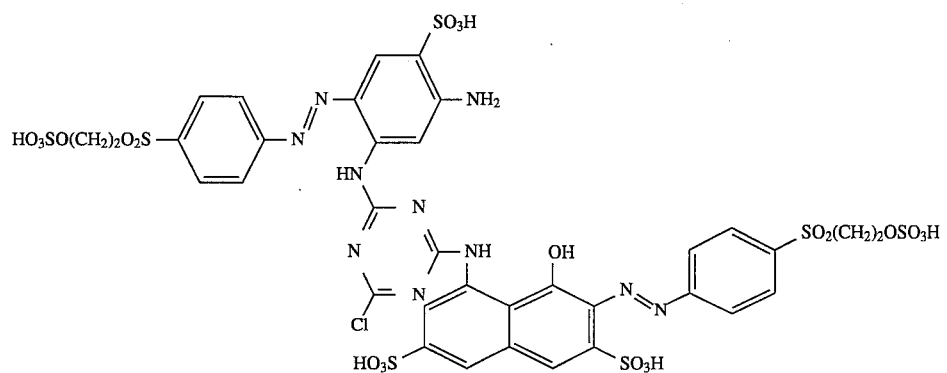 |
| 30m | 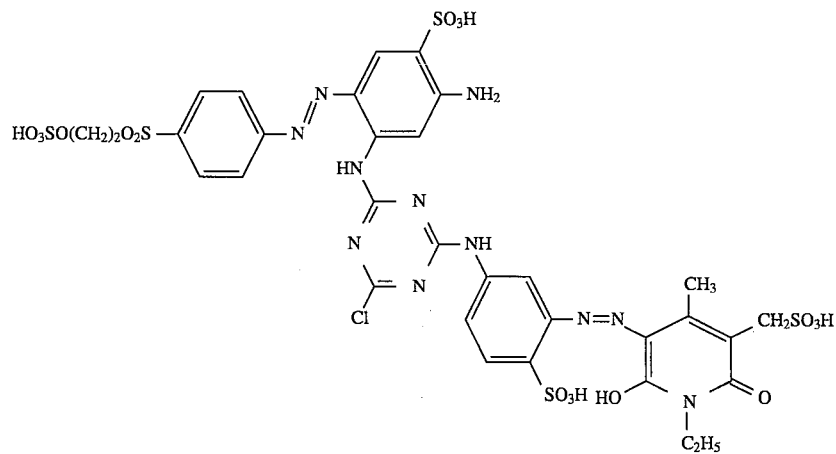 |
| 30n | 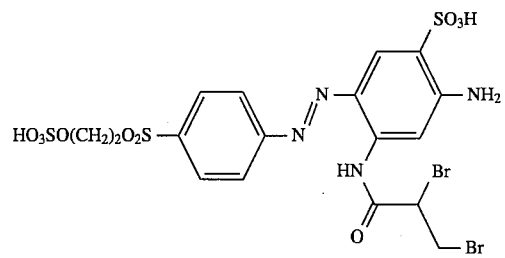 |

| Ex.: | Compound of the formula |
|---|---|
| 30o | 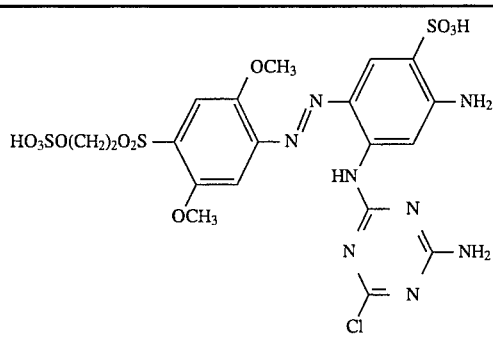 |
| 30p | 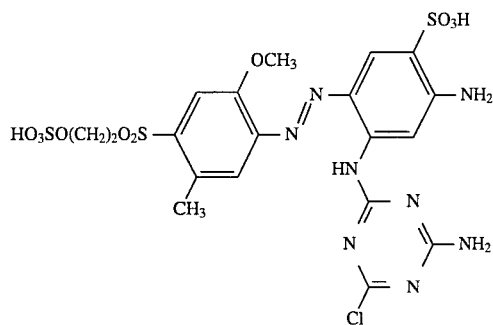 |
| 30q | 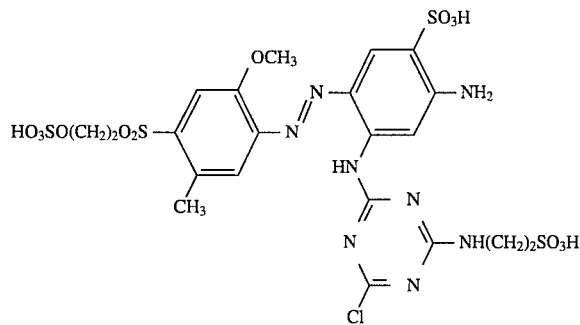 |

Preparation of the dyes of the formula (1)

Example 31

8.6 parts of the compound of Example 1 are diazotized in a conventional manner using sodium nitride and hydrochloric acid and coupled onto 2.1 parts of m-sulfonylmethylpyrazolidine under neutral conditions. After the coupling reaction has ended, the reaction solution is subjected to reverse osmosis and freeze-dried, leaving the dye of the formula:

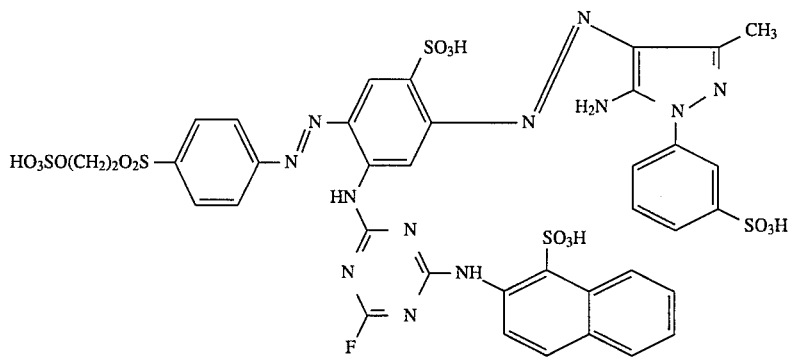

It dyes cotton in scarlet shades having good allround fastness properties.

dye cotton in the stated shade with good allround fastness properties.

Examples 32–80

Similar dyes are obtained on reacting the diazo components and coupling components mentioned in the table with each other as described in Example 31. The dyes obtained

| Ex. No. | Diazo-component of Example | Coupling component | Shade |
|---|---|---|---|
| 32 | 1 | ![structure: pyridone with CH3, CONH2, HO, N-C2H5, =O] | Orange |
| 33 | 1 | ![structure: pyridone with CH3, CH2SO3H, HO, N-C2H5, =O] | Orange |
| 34 | 1 | ![structure: pyridone with CH3, SO2H, HO, N-C2H5, =O] | Orange |
| 35 | 1 | ![structure: naphthalene with H2N, CH3, HO, SO3H] | Navy |
| 36 | 6 | ![structure: aminopyrazole with CH3, H2N, N-phenyl-SO3H] | Scarlet |
| 37 | 6 | ![structure: pyridone with CH3, CONH2, HO, N-C2H5, =O] | Orange |

-continued

| Ex. No. | Diazo-component of Example | Coupling component | Shade |
|---|---|---|---|
| 38 | 6 | 1-ethyl-3-(sulfomethyl)-4,5-dimethyl-6-hydroxy-2-pyridone | Orange |
| 39 | 6 | 3-hydroxy-4-methyl-7-sulfo-naphthalene | Red |
| 40 | 6 | 2-amino-8-hydroxy-1-methyl-6-sulfo-naphthalene | Navy |
| 41 | 6 | 2-methylamino-8-hydroxy-1-methyl-6-sulfo-naphthalene | Greenish blue |
| 42 | 7 | 1-ethyl-3-carbamoyl-4,5-dimethyl-6-hydroxy-2-pyridone | Orange |
| 43 | 7 | 1-ethyl-3-(sulfomethyl)-4,5-dimethyl-6-hydroxy-2-pyridone | Orange |

-continued

| Ex. No. | Diazo-component of Example | Coupling component | Shade |
|---|---|---|---|
| 44 | 7 | ![structure: 1-methyl-2-hydroxy-naphthalene-6-sulfonic acid] HO, SO₃H | Red |
| 45 | 7 | ![pyrazole structure] H₂N, CH₃, N, N, phenyl-SO₃H | Scarlet |
| 46 | 7 | ![naphthalene structure] H₂N, HO, SO₃H | Navy |
| 47 | 7 | ![naphthalene structure] HN-CH₃, HO, SO₃H | Greenish blue |
| 48 | 7 | ![naphthalene structure] H₂N, SO₃H | Bordeaux |
| 49 | 7 | ![azo structure] OH, NH₂, N=N-phenyl-SO₃H, HO₃S, SO₃H | Olive |

-continued

| Ex. No. | Diazo-component of Example | Coupling component | Shade |
|---|---|---|---|
| 50 | 7 | (structure) | Red |
| 51 | 7 | (structure) | Violet |
| 52 | 21 | (structure) | Orange |
| 53 | 28 | (structure) | Scarlet |
| 54 | 28 | (structure) | Orange |
| 55 | 28 | (structure) | Red |
| 56 | 28 | (structure) | Navy |

-continued

| Ex. No. | Diazo-component of Example | Coupling component | Shade |
|---|---|---|---|
| 57 | 28 | 6-(methylamino)-1-methyl-5-hydroxynaphthalene-... -SO₃H (naphthalene with HN-CH₃, HO, SO₃H) | Greenish blue |
| 58 | 28 | 7-amino-1-methylnaphthalene-... -SO₃H (H₂N, naphthalene, SO₃H) | Bordeaux |
| 59 | 6 | 4-hydroxy-3-methyl-7-acetylaminonaphthalene-2-sulfonic acid (OH, HO₃S, NHCOCH₃) | Red |
| 60 | 1 | 7-amino-1-methylnaphthalene-...-SO₃H (H₂N, naphthalene, SO₃H) | Bordeaux |
| 61 | 1 | 7-hydroxy-1-methylnaphthalene-...-SO₃H (HO, naphthalene, SO₃H) | Red |
| 62 | 6 | 7-amino-1-methylnaphthalene-...-SO₃H (H₂N, naphthalene, SO₃H) | Bordeaux |

-continued

| Ex. No. | Diazo-component of Example | Coupling component | Shade |
|---|---|---|---|
| 63 | 6 | (structure: 1-amino-8-hydroxy-7-methyl-naphthalene-3,6-disulfonic acid coupled with 4-(β-sulfatoethylsulfonyl)phenyl diazo) HO₃S, OH, NH₂, N=N—C₆H₄—SO₂(CH₂)₂OSO₃H, SO₃H | Olive |
| 64 | 7 | (same structure as 63) | Olive |
| 65 | 30n | H₂N-, HO-, SO₃H substituted naphthalene with methyl | Navy |
| 66 | 30l | (same structure as 63) | Black |
| 67 | 6 | H₂N-, SO₃H, HO-, SO₃H substituted naphthalene with methyl | Navy |
| 68 | 6 | OH, HN—C(=N)—triazine with two Cl, naphthalene with methyl, HO₃S, SO₃H | Violet |
| 69 | 6 | OH, HO₃S, NH₂, SO₃H substituted naphthalene with methyl | Red |

-continued

| Ex. No. | Diazo-component of Example | Coupling component | Shade |
|---|---|---|---|
| 70 | 6 | (structure: chlorotriazine-linked naphthalenesulfonic acid coupled via amino-sulfo-phenyl to azo-phenyl-SO₂(CH₂)₂OSO₃H) | Brown |
| 71 | 6 | (structure: chlorotriazine-linked naphthalenesulfonic acid with H₂N, SO₃H substituted phenyl) | Violet |
| 72 | 6 | 4-hydroxy-3-methyl-6-amino-naphthalene-2,7-disulfonic acid | Navy |
| 73 | 30b | 4-hydroxy-3-methyl-7-acetamido-naphthalene-6-sulfonic acid (HO₃S, NHCOCH₃) | Red |
| 74 | 30b | (8-hydroxy-7-methyl-1-amino-2-(4-SO₂(CH₂)₂OSO₃H-phenylazo)-naphthalene-3,6-disulfonic acid) | Olive |
| 75 | 30b | 7-amino-8-methyl-4-hydroxy-naphthalene-2-sulfonic acid | Navy |
| 76 | 30b | 3-amino-4-methyl-5-hydroxy-naphthalene-2,7-disulfonic acid | Navy |

| Ex. No. | Diazo-component of Example | Coupling component | Shade |
|---|---|---|---|
| 77 | 6 | | Blue |
| 78 | 6 | | Blue |
| 79 | 30m | | Green |
| 80 | 6 | | Blue |

Dyeing Method I 2 parts of the dye of Example 31 are dissolved in 400 parts of water; 1500 parts of a solution containing 53 g of sodium chloride per liter are added. This dyebath is entered at 40° C. with 100 parts of a cotton fabric. After 45 minutes 100 parts of a solution containing 16 g of sodium hydroxide and 20 g of anhydrous sodium carbonate per liter are added. The temperature of the dyebath is held at 40° C. for a further 45 minutes. Then the dyed fabric is rinsed, soaped off at the boil for a quarter of an hour with a nonionic detergent, rinsed once more and dried.

Dyeing Method II 2 parts of the reactive dye of Example 31 are dissolved in 400 parts of water, 1500 parts of a solution containing 53 g of sodium chloride per liter are added. This dyebath is entered at 35° C. with 100 parts of a cotton fabric. After 20 minutes 100 parts of a solution containing 16 g of sodium hydroxide and 20 g of anhydrous sodium carbonate per liter are added. The temperature of the dyebath is held at 35° C. for a further 15 minutes. The temperature is then raised over 20 minutes to 60° C. The temperature is held at 60° C. for a further 35 minutes. Thereafter the dyed fabric is rinsed, soaped off at the boil for a quarter of an hour with a nonionic detergent, rinsed once more and dried.

Dyeing Method III 8 parts of the reactive dye of Example 31 are dissolved in 400 parts of water; 1400 parts of a solution containing 100 g of sodium sulfate per liter are added. This dyebath is entered at 25° C. with 100 parts of a cotton fabric. After 10 minutes 200 parts of a solution containing 150 g of trisodium phosphate per liter are added. Then the temperature of the dyebath is raised to 60° C. over 10 minutes. The temperature is held at 60° C. for a further 90 minutes. Thereafter the dyed fabric is rinsed, soaped off at the boil for a quarter of an hour with a nonionic detergent, rinsed once more and dried.

Dyeing Method IV 4 parts of the reactive dye of Example 31 are dissolved in 50 parts of water. 50 parts of a solution containing 5 g of sodium hydroxide and 20 g of anhydrous sodium carbonate per liter are added. The solution obtained is used for padding a cotton fabric to a wet pick-up of 70 % of its weight and the fabric is then wound onto a batching roller. It is stored in that state at room temperature for 3 hours. Thereafter the dyed fabric is rinsed, soaped off at the boil for a quarter of an hour with a nonionic detergent, rinsed once more and dried.

Dyeing Method V 6 parts of the reactive dye of Example 31 are dissolved in 50 parts of water. 50 parts of a solution containing 16 g of sodium hydroxide and 0.04 l of 38° Bé waterglass per liter are added. The solution obtained is used for padding a cotton fabric to a wet pick-up of 70% of its weight and the fabric is then wound onto a batching roller. It is stored in that state at room temperature for 10 hours. Thereafter the dyed fabric is rinsed, soaped off at the boil for a quarter of an hour with a nonionic detergent, rinsed once more and dried.

Dyeing Method VI 2 parts of the reactive dye of Example 31 are dissolved in 100 parts of water with 0.5 parts of sodium m-nitrobenzenesulfonate. The solution obtained is used for impregnating a cotton fabric to a wet pick-up of 75% of its weight and the fabric is then dried. The fabric is then impregnated with a 20° C. solution containing 4 g of sodium hydroxide and 300 g of sodium chloride per liter, squeezed off to a weight increase of 75%, the dyeing is steamed at 100°–102° C. for 30 seconds, rinsed, soaped off at the boil for a quarter of an hour in a 0.3% solution of a nonionic detergent, rinsed and dried.

Printing Method I 3 parts of the reactive dye of Example 31 are sprinkled with rapid stirring into 100 parts of a stock thickening containing 50 parts of 5% sodium alginate thickening, 27.8 parts of water, 20 parts of urea, 1 part of sodium m-nitrobenzenesulfonate and 1.2 parts of sodium bicarbonate. The resulting print paste is used for printing a cotton fabric, which is then dried and steamed at 102° C. in saturated steam for 2 minutes. The fabric bearing the print is then rinsed, if desired soaped off at the boil and rinsed once more, and subsequently dried.

Printing Method II 5 parts of the reactive dye of Example 31 are sprinkled with rapid stirring into 100 parts of a stock thickening containing 50 parts of 5 % sodium alginate thickening, 36.5 parts of water, 10 parts of urea, 1 part of sodium m-nitrobenzenesulfonate and 2.5 parts of sodium bicarbonate. The resulting print paste, the stability of which corresponds to the industrial requirements, is used for printing a cotton fabric, which is then dried and steamed at 102° C. in saturated steam for 8 minutes. The fabric bearing the print is then rinsed, if desired soaped off at the boil and rinsed once more, and subsequently dried.

What is claimed is:

1. A compound of the formula

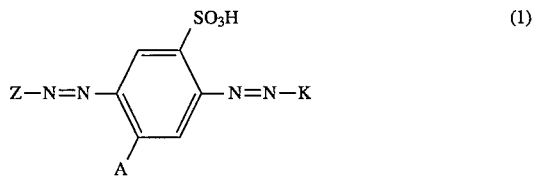

where

Z is the radical of a diazo component of the benzene or naphthalene series which carries at least one fiber-reactive radical of the formula —$SO_2$—Y (3a), —CONH—$(CH_2)_m$—$SO_2$—Y (3b), —CONH—$(CH_2)_{m_1}$—O—$(CH_2)_m$—$SO_2$—Y (3c), $(O)_p$—$(CH_2)_q$—CONH—$(CH_2)_m$—$SO_2$—Y (3d), —NH—CO—$CHX_1$–$CH_2X_1$ (3e) or NH—CO—$CX_1$=$CH_2$ (3f), $X_1$ is chlorine or bromine, Y is vinyl, β-chloroethyl, β-sulfatoethyl, β-thiosulfatoethyl, β-acetoxyethyl, β-phenoxyethyl or β-phosphatoethyl, p is 0 or 1, and m, $m_1$ and q are each independently of the others an integer from 1 to 6, A is a fiber-reactive radical —NR'—$A_1$, R' is hydrogen or $C_1$–$C_4$alkyl, $A_1$ is a triazinyl radical or a radical of the formula

where T is chlorine, fluorine, bromine, 3-carboxypyridin-1-yl, 3-carbamoylpyridin-1-yl or a reactive radical of the formula

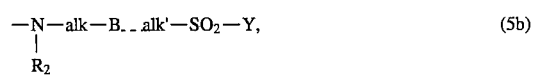

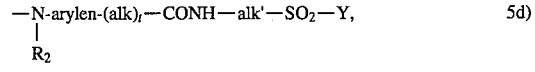

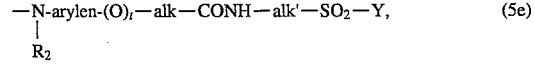

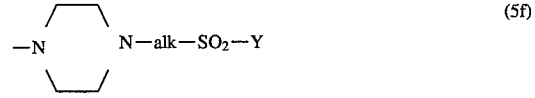

or

R is hydrogen, unsubstituted or hydroxyl-, sulfo-, sulfato-, carboxyl- or cyano-substituted $C_1$–$C_4$alkyl or a radical

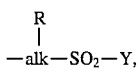

$R_1$ is hydrogen, hydroxyl, sulfo, sulfato, carboxyl, cyano, halogen, $C_1$–$C_4$alkoxycarbonyl, $C_2$–$C_5$alkanoyloxy, carbamoyl or the group —$SO_2$—Y, $R_2$ is hydrogen or $C_1$–$C_4$alkyl, alk and alk' are each independently of the other $C_1$–$C_6$alkylene, arylen is unsubstituted or sulfo-, carboxyl-, hydroxyl-, $C_1$–$C_4$alkyl-, $C_1$–$C_4$alkoxy- or halogen-substituted phenylene or naphthylene, $Y_1$ is a group —$CHX_1$–$CH_2X_1$ or —$CX_1$=$CH_2$, and $X_1$ is chlorine or bromine, B is the radical —O— or —$NR_2$—, t is 0 or 1, V independently has the meaning of T or is a non-reactive radical selected from the group consisting of hydroxyl, $C_1$–$C_4$alkoxy, phenoxy, $C_1$–$C_4$alkylthio, morpholino, amino, N-$C_1$–$C_4$alkylamino or N,N-di-$C_1$–$C_4$alkylamino, in which case the alkyl is each unsubstituted or sulfo-, sulfato-, hydroxyl-, carboxyl- or phenyl-substituted, cyclohexylamino, N—$C_1$–$C_4$alkyl-N-phenylamino or phenylamino or naphthylamino, in which case the phenyl or naphthyl is each unsubstituted or $C_1$–$C_4$alkyl-, $C_1$–$C_4$alkoxy-, amino-, $C_2$–$C_5$alkanoylamino-, carboxyl-, sulfo- or halogen-substituted, and K is a 1- or 2-naphthol radical which is unsubstituted or substituted by sulfo or by a radical —$SO_2$—Y, or is a radical of the formula

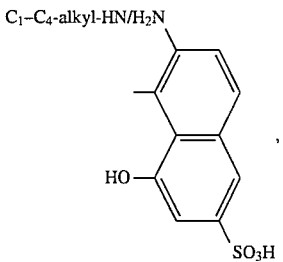

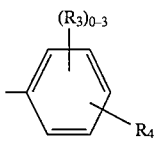 (6a)

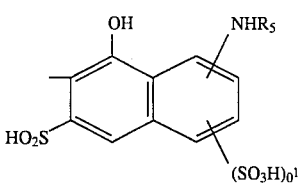 (6b)

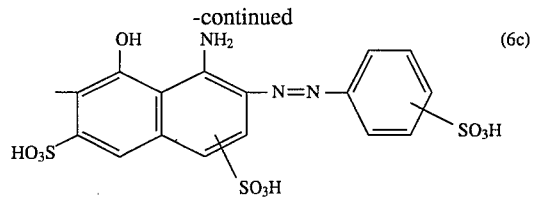 (6c)

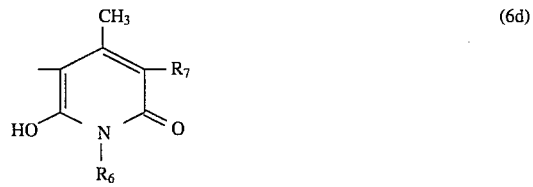 (6d)

or

 (6e)

where $(R_3)_{0-3}$ represents 0 to 3 radicals selected from the group consisting of $C_1$–$C_4$alkyl, $C_1$–$C_4$alkoxy, halogen, $C_1$–$C_4$alkoxy-$C_1$–$C_2$alkoxy, hydroxyl, hydroxy-$C_1$–$C_2$alkoxy, $C_2$–$C_5$alkanoyloxy, $C_1$–$C_4$alkylsulfonyl, $C_2$–$C_5$alkanoylamino, N—$C_1$–$C_4$alkylsulfonamoyl and sulfo, $R_4$ is hydroxyl, $C_1$–$C_4$alkoxy or a radical —$NR_{11}R_{12}$ and $R_{11}$ and $R_{12}$ are each independently of the other hydrogen, $C_2$–$C_5$alkanoyl or unsubstituted or hydroxyl-, sulfo- or sulfato-substituted $C_1$–$C_4$alkyl, $R_5$ is hydrogen, $C_2$–$C_5$alkanoyl, benzoyl or a radical of the above formula (4), $R_6$ is $C_1$–$C_4$alkyl, $R_7$ is carbamoyl, cyano or sulfomethyl, $R_8$ is $C_1$–$C_4$alkyl or carboxyl, $R_9$ is unsubstituted or halogen-, sulfo-, $C_1$–$C_4$alkyl- or $C_1$–$C_4$alkoxy-substituted phenyl or naphthyl, and $R_{10}$ is hydroxyl or amino, or K is a radical of the formula

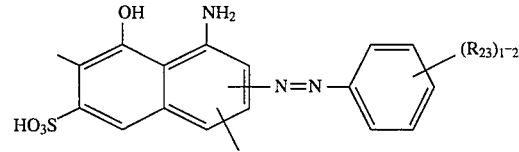

or

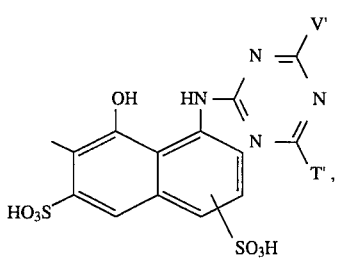

where $(R_{23})_{1-2}$ represents 1 or 2 identical or different radicals selected from the group consisting of sulfo, methyl, methoxy and —$SO_2$—Y, where Y is as defined above, T' is chlorine or fluorine, and V' is amino, N—$C_1$–$C_4$alkylamino or N,N-di-$C_1$–$C_4$alkylamino, the alkyl being unsubstituted or sulfo-, sulfato-, hydroxyl-, carboxyl- or phenyl-substituted, cyclohexylamino, N—$C_1$–$C_4$alkyl-N-phenylamino or phenylamino or naphthylamino, the phenyl or naphthyl being unsubstituted or $C_1$–$C_4$alkyl-, $C_1$–$C_4$alkoxy-, amino-, $C_2$–$C_4$alkanoylamino-, carboxyl-, sulfo- or halogen-substituted, a radical of the formula

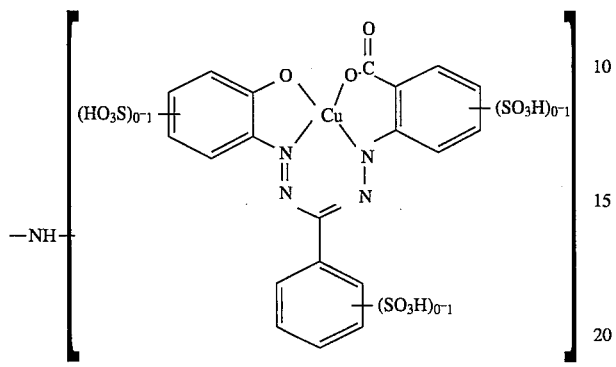

or a monoazo radical —(D—N=N—$K_1$), where D is a phenyl or 1- or 2-naphthyl radical which is substituted by from 1 to 3 substituents selected from the group consisting of methyl, methoxy, chlorine, sulfo and —$SO_2$—Y, where Y is as defined above, and $K_1$ is the radical of H-, K-, I- or J-acid or a radical of the above-indicated formula (6a), (6b), (6d) or (6e).

2. A compound according to claim 1, wherein K is a 1- or 2-naphthol radical with or without substitution by sulfo or 2-amino-6-sulfo-8-hydroxy-1-naphthyl, or is a radical of the formula (6a), (6b), (6c), (6d) or (6e) as indicated in claim 23.

3. A compound according to claim 1, wherein K is a radical of the formula

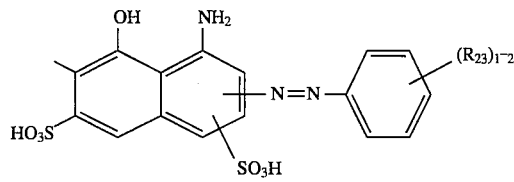

or

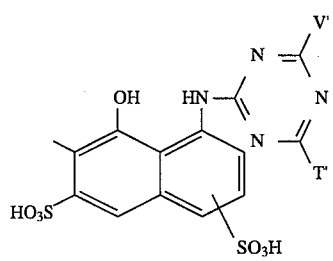

where $(R_{23})_{1-2}$, T' and V' are as defined in claim 1.

4. A compound of formula (1) according to claim 1, wherein Z is a radical of the formula

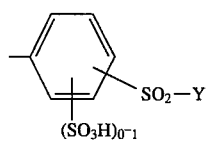

or

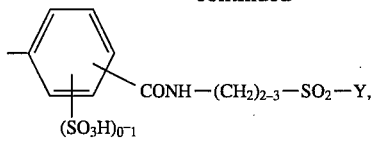

where Y is vinyl or β-sulfatoethyl,

A is a fiber-reactive radical —NR'—$A_1$,

R' is hydrogen or $C_1$–$C_4$alkyl, $A_1$ is a triazinyl radical or a radical of the formula

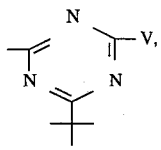

(4)

T is chlorine or fluorine,

V is amino, N-methylamino, N-ethylamino, β-sulfoethylamino, phenylamino, 2-, 3- or 4-sulfophenylamino, 2,4- or 2,5-disulfophenylamino, mono-, di- or trisulfo-2-naphthylamino, N—$C_1$–$C_2$alkyl-N-phenylamino or morpholino, and K is a radical of the formula

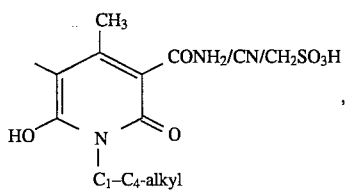

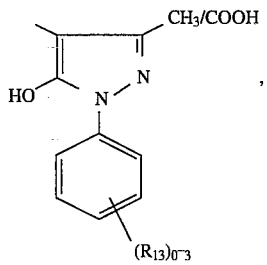

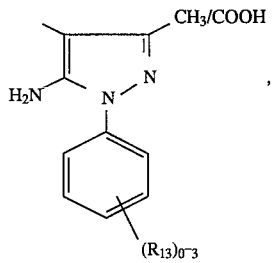

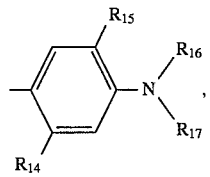

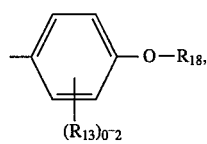

-continued

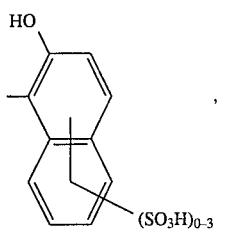

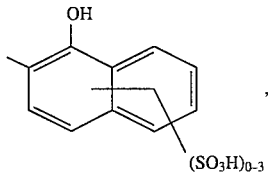

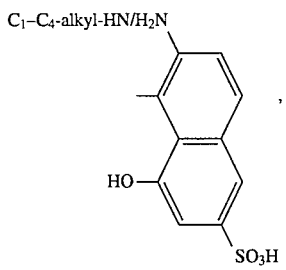

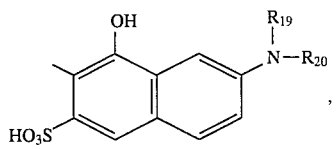

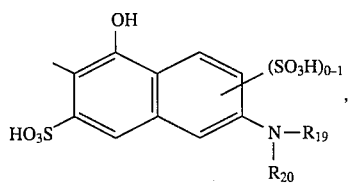

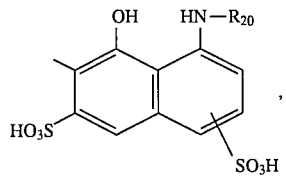

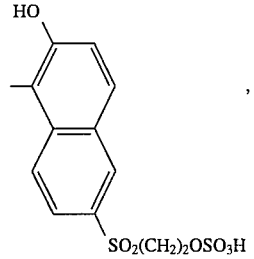

where $(R_{13})_{0-3}$ represents 0 to 3 identical or different substituents selected from the group consisting of methyl, methoxy, hydroxyl, chlorine and sulfo, R14 is hydrogen, methyl, methoxy, hydroxyl, chlorine, acetyl, acetylamino, hydroxyacetylamino, propionylamino, ureido or methyl- or ethylsulfonyl, $R_{15}$ is hydrogen, methyl, methoxy, chlorine or $C_1$–$C_{14}$alkoxy-$C_1$–$C_2$alkoxy, $R_{16}$ and $R_{17}$ are each independently of the other hydrogen, $C_1$–$C_4$alkyl, β-hydroxyethyl or β-sulfatoethyl, $R_{18}$ is hydrogen, $C_1$–$C_4$alkyl, $C_1$–$C_4$alkoxy-$C_1$–$C_4$alkyl or phenyl, $R_{19}$ is hydrogen, methyl, ethyl, β-hydroxyethyl, β-cyanoethyl or β-sulfatoethyl, and $R_{20}$ is acetyl, propionyl or a radical of the above-indicated formula (4).

5. A compound according to claim 4, wherein K is a radical of the formula

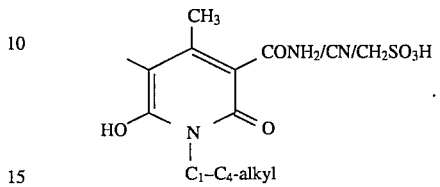

6. A compound according to claim 4, wherein K is a radical of the formula

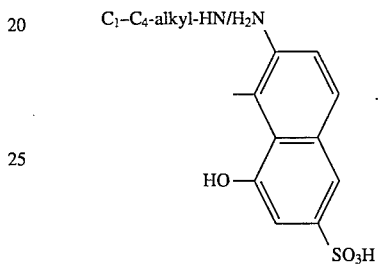

7. A compound according to claim 1, wherein Y is β-sulfatoethyl or vinyl.

8. A compound according to claim 1, wherein T is chlorine or fluorine, and V is $C_1$–$C_4$alkoxy, $C_1$–$C_4$alkylthio, hydroxyl, amino, N-$C_1$–$C_4$alkylamino, with or without hydroxyl, sulfato or sulfo substitution in the alkyl moiety, morpholino, phenylamino or N—$C_1$–$C_4$alkyl-N-phenylamino, where the phenyl is in each case unsubstituted or sulfo-, carboxyl-, acetylamino-, methyl- or methoxy-substituted, sulfo-monosubstituted, -disubstituted or -trisubstituted 2-naphthylamino, or a reactive radical of the formula (5a) to (5g).

9. A compound according to claim 1, wherein T is chlorine or fluorine, and V is amino, N—$C_1$–$C_4$alkylamino, with or without hydroxyl, sulfato or sulfo substitution in the alkyl moiety, morpholino, phenylamino or N-$C_1$–$C_4$alkyl-N-phenylamino, where the phenyl is in each case unsubstituted or sulfo-, carboxyl-, acetylamino-, methyl- or methoxy-substituted, or sulfomono-substituted, -disubstituted or -trisubstituted 2-naphthylamino.

10. A compound according to claim 1, wherein T is chlorine or fluorine, and V is amino, N-methylamino, N-ethylamino, β-sulfoethylamino, phenylamino, 2-, 3- or 4-sulfophenylamino, 2,4- or 2,5-disulfophenylamino, mono-, di- or trisulfo-2-naphthylamino, N—$C_1$–$C_2$alkyl-N-phenylamino or morpholino.

11. A compound according to claim 1, wherein T is chlorine or fluorine, and V is a reactive radical of the formula (5a) to (5g) where R, $R_1$ and $R_2$ are each hydrogen, B is —O— or —NH—, alk and alk' are each independently of the other ethylene or propylene, arylen is unsubstituted or methyl-, methoxy-, chlorine-, hydroxyl-, carboxyl- or sulfo-substituted phenylene, Y is vinyl or β-sulfatoethyl, $Y_1$ is —CHBr-CH$_2$Br or —CBr=CH$_2$ and t is 0.

12. A compound according to claim 1, wherein T is chlorine or fluorine, and V is a fiber-reactive radical of the formula

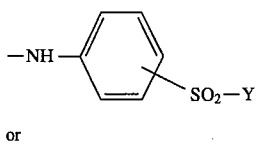

or

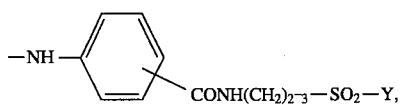

where Y is vinyl or β-sulfatoethyl.

13. A compound according to claim 1, wherein Z is a fiber-reactive radical of the formula

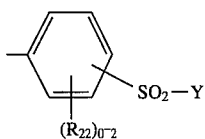 (7a)

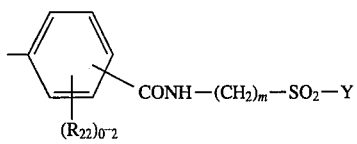 (7b)

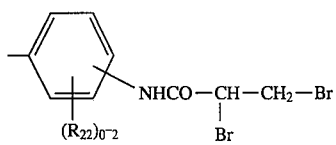 (7c)

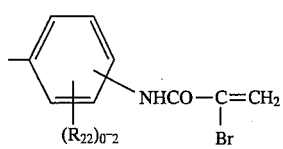 (7d)

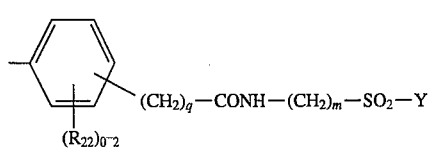 (7e)

or

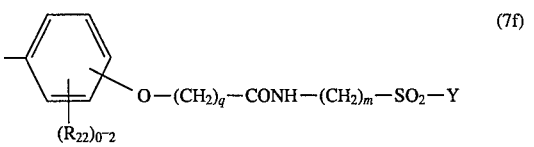 (7f)

where Y is as defined in claim 1, $(R_{22})_{0-2}$ represents 0 to 2 identical or different radicals selected from the group consisting of methyl, methoxy, chlorine, hydroxyl and sulfo, q is 1 or 2, and m is 2 or 3.

14. A compound according to claim 1, wherein Z is a fiber-reactive radical of the formula

 (7a')

or

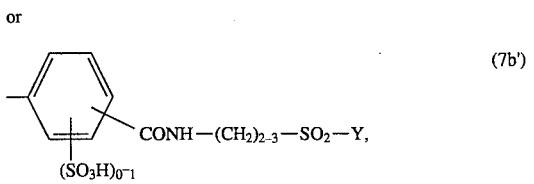 (7b')

where Y is vinyl or β-sulfatoethyl.

15. A compound of the formula (1) according to claim 1, having at least two sulfo or sulfato groups.

16. The process for dyeing or printing cellulosic textile fiber material which comprises applying to the fiber material a compound of formula (1) according to claim 1.

17. The process according to claim 16 for dyeing or printing cotton.

* * * * *